US010656656B2

(12) United States Patent
Jun et al.

(10) Patent No.: US 10,656,656 B2
(45) Date of Patent: May 19, 2020

(54) MOBILE ROBOT AND METHOD FOR CONTROLLING AND DETECTING INCLINATION USING PATTERN LIGHT

(71) Applicant: LG ELECTRONICS INC., Seoul (KR)

(72) Inventors: Woochan Jun, Seoul (KR); Chulmo Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 15/597,670

(22) Filed: May 17, 2017

(65) Prior Publication Data

US 2017/0336796 A1 Nov. 23, 2017

(30) Foreign Application Priority Data

May 17, 2016 (KR) .................. 10-2016-0060444
Sep. 1, 2016 (KR) .................. 10-2016-0112779
Oct. 27, 2016 (KR) .................. 10-2016-0141106

(51) Int. Cl.
*G05D 1/02* (2020.01)
*A47L 9/04* (2006.01)
(Continued)

(52) U.S. Cl.
CPC .............. *G05D 1/0246* (2013.01); *A47L 5/22* (2013.01); *A47L 9/009* (2013.01); *A47L 9/0472* (2013.01);
(Continued)

(58) Field of Classification Search
CPC .... G05D 1/027; G05D 1/0248; A47L 9/0488; A47L 9/0472
See application file for complete search history.

(56) References Cited

U.S. PATENT DOCUMENTS 4,954,962 A 9/1990 Evans, Jr. et al.
6,496,754 B2 12/2002 Song et al.
(Continued)

FOREIGN PATENT DOCUMENTS

CN 103941735 7/2014
CN 203943625 11/2014
(Continued)

OTHER PUBLICATIONS

United States Office Action dated Feb. 1, 2019 issued in co-pending related U.S. Appl. No. 15/597,333.
(Continued)

*Primary Examiner* — Peter D Nolan
*Assistant Examiner* — Ana D Thomas
(74) *Attorney, Agent, or Firm* — Ked & Associates, LLP

(57) ABSTRACT

A mobile robot of the present disclosure emits a first patterned light downward and forward from a main body on a floor of an area to be cleaned and a second patterned light upward and forward from the main body, determines an obstacle based on an image of each emitted patterned light which is incident on the obstacle, and senses a tilt of the main body to compensate for the tilt. In this manner, an obstacle may be determined accurately, and after the tilt compensation, redetermination is made as to whether it is possible to pass through, so as to enable the mobile robot to pass through or bypass the obstacle. Accordingly, the mobile robot may reach a wider area to be cleaned, thereby extending the area that may be cleaned, and enabling fast determination and operation for effective traveling, such that the mobile robot may escape from an obstacle without being limited thereby.

20 Claims, 25 Drawing Sheets

(51) Int. Cl.
  *A47L 9/00*   (2006.01)
  *A47L 5/22*   (2006.01)
  *A47L 9/28*   (2006.01)

(52) U.S. Cl.
  CPC .......... *A47L 9/0477* (2013.01); *A47L 9/0488* (2013.01); *A47L 9/2826* (2013.01); *A47L 9/2852* (2013.01); *A47L 9/2873* (2013.01); *G05D 1/027* (2013.01); *G05D 1/0214* (2013.01); *G05D 1/0248* (2013.01); *A47L 2201/022* (2013.01); *A47L 2201/04* (2013.01); *G05D 2201/0203* (2013.01)

(56) References Cited

U.S. PATENT DOCUMENTS

| | | | |
|---|---|---|---|
| 8,693,007 | B2 | 4/2014 | Ishigaki |
| 8,781,626 | B2 | 7/2014 | Landry et al. |
| 8,862,271 | B2 | 10/2014 | Shamlian et al. |
| 9,339,163 | B2 | 5/2016 | Noh et al. |
| 9,440,355 | B2 | 9/2016 | Noh et al. |
| 9,511,494 | B2 | 12/2016 | Noh et al. |
| 9,981,593 | B2 | 5/2018 | Mayer |
| 2005/0000543 | A1 | 1/2005 | Taylor et al. |
| 2010/0110280 | A1 | 5/2010 | Aoyama |
| 2010/0257690 | A1 | 10/2010 | Jones et al. |
| 2011/0144805 | A1 | 6/2011 | Chiappetta et al. |
| 2011/0245972 | A1* | 10/2011 | Yan ............... A47L 11/4061 700/258 |
| 2014/0209122 | A1 | 7/2014 | Jung et al. |
| 2014/0304937 | A1 | 10/2014 | Kim et al. |
| 2015/0120056 | A1 | 4/2015 | Noh et al. |
| 2015/0168954 | A1* | 6/2015 | Hickerson ........... G01S 17/026 700/259 |
| 2015/0363914 | A1 | 12/2015 | Boyle et al. |
| 2016/0104044 | A1* | 4/2016 | Noh ................ G06K 9/00664 |
| 2016/0279808 | A1 | 9/2016 | Doughty et al. |
| 2017/0072558 | A1 | 3/2017 | Reynolds et al. |
| 2017/0154219 | A1 | 6/2017 | Shin et al. |

FOREIGN PATENT DOCUMENTS

| | | |
|---|---|---|
| CN | 104245244 | 12/2014 |
| CN | 104586322 | 5/2015 |
| CN | 104597902 | 5/2015 |
| CN | 205031182 | 2/2016 |
| JP | 2013-104858 | 5/2013 |
| JP | 2014-048842 | 3/2014 |
| KR | 10-2013-0141979 | 12/2013 |
| KR | 10-1362373 | 2/2014 |
| KR | 10-2015-0050160 | 5/2015 |
| KR | 10-2015-0065972 | 6/2015 |
| KR | 10-2016-0043841 | 4/2016 |

OTHER PUBLICATIONS

U.S. Appl. No. 15/597,333, filed May 17, 2017.
U.S. Appl. No. 15/597,418, filed May 17, 2017.
U.S. Appl. No. 15/597,531, filed May 17, 2017.
PCT International Search Report (with English Translation) dated Sep. 4, 2017 issued in Application No. PCT/KR2017/005136.
Taiwanese Office Action dated Feb. 5, 2018 issued in Application No. 106116151.
PCT International Search Report (with English Translation) dated Feb. 26, 2018 issued in Application No. PCT/KR2017/005132.
Taiwanese Office Action dated Mar. 14, 2018 issued in Application No. 106116158.
PCT International Search Report (with English Translation) dated Feb. 20, 2018 issued in Application No. PCT/KR2017/005133.
PCT International Search Report (with English Translation) dated Feb. 26, 2018 issued in Application No. PCT/KR2017/005135.
Taiwanese Office Action dated Feb. 26, 2018 issued in Application No. 106116156.
Korean Office Action dated Mar. 20, 2018 issued in Application No. 10-2016-0141106.
Taiwanese Office Action dated Mar. 29, 2018 issued in Application No. 106116154.
U.S. Office Action issued in co-pending related U.S. Appl. No. 15/597,531 dated Oct. 5, 2018.
U.S. Office Action dated Feb. 26, 2019 issued in U.S. Appl. No. 15/597,418.

\* cited by examiner

Fig. 10
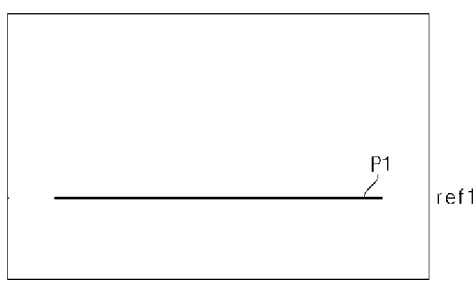
(a)
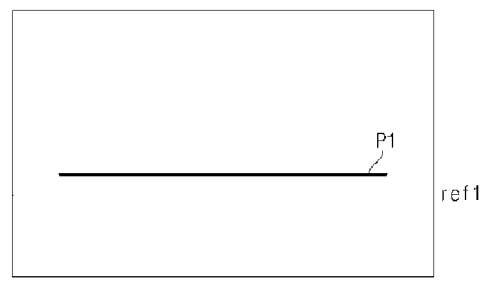
(b)
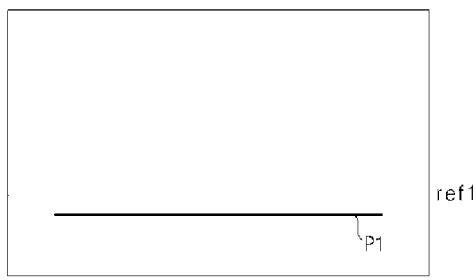
(c)
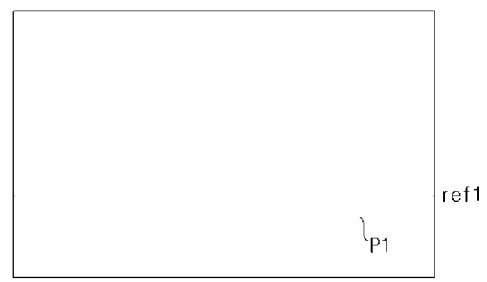
(d)
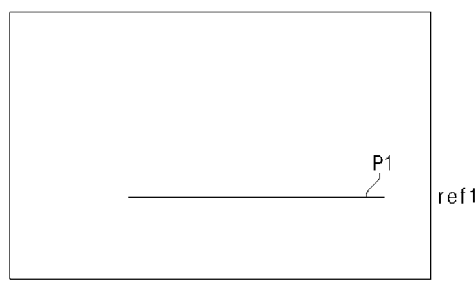
(e)

Fig. 15
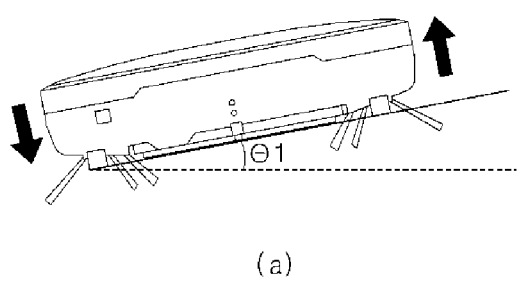
(a)
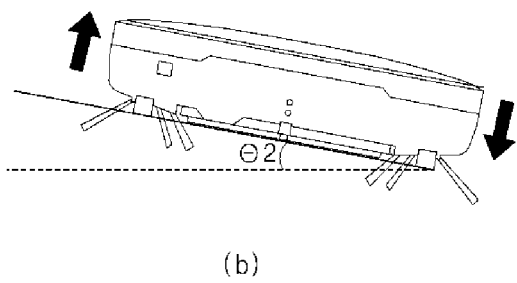
(b)
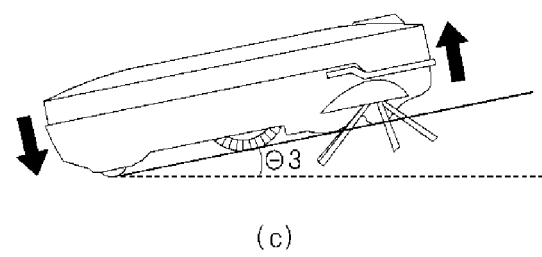
(c)
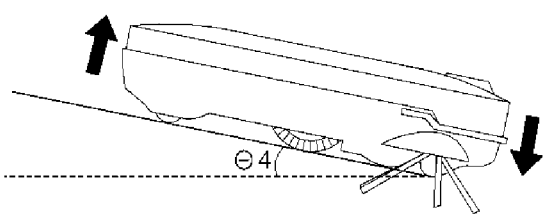
(d)

Fig. 18
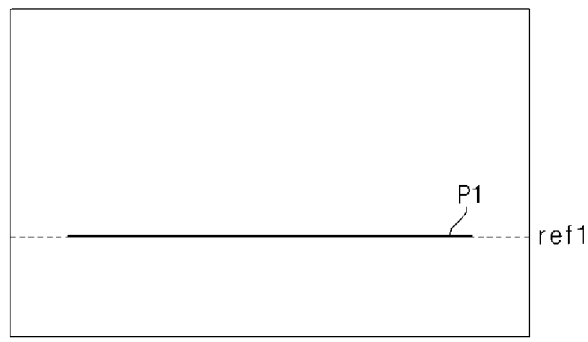
(a)
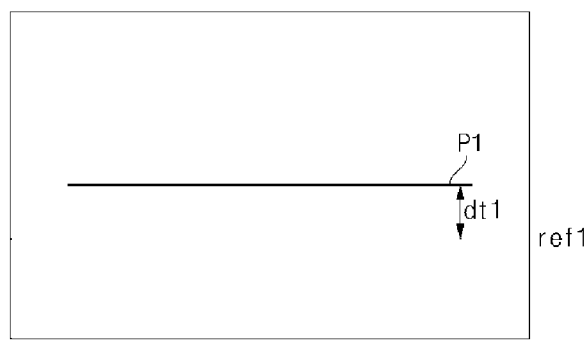
(b)
(c)

Fig. 20
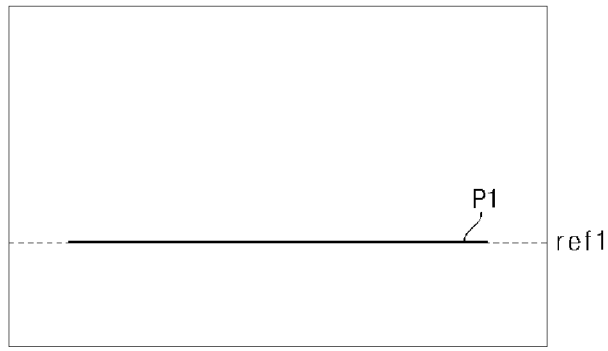
(a)
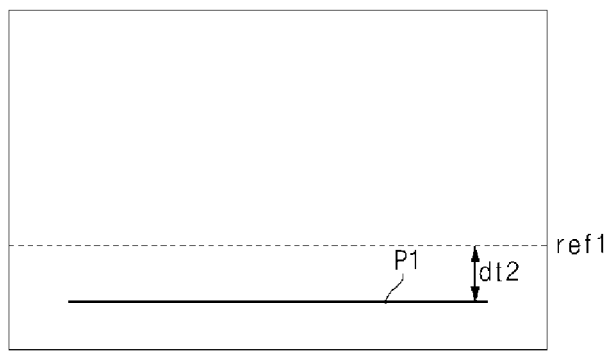
(b)
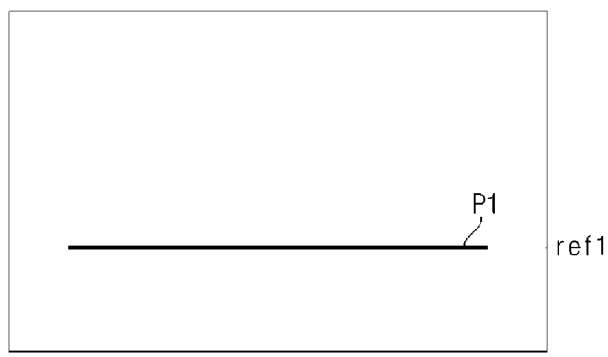
(c)

MOBILE ROBOT AND METHOD FOR CONTROLLING AND DETECTING INCLINATION USING PATTERN LIGHT

CROSS-REFERENCE TO RELATED APPLICATION(S)

This application claims the priority benefit of Korean Patent Application No. 10-2016-0060444, filed on May 17, 2016, Korean Patent Application No. 10-2016-0112779, filed on Sep. 1, 2016 and Korean Patent Application No. 10-2016-0141106, filed on Oct. 27, 2016 in the Korean Intellectual Property Office, the disclosures of which are incorporated herein by reference.

BACKGROUND

1. Field

The present disclosure relates to a mobile robot and a method of controlling the same, in which the mobile robot may detect and bypass obstacles.

2. Background

A mobile robot is a home appliance that performs cleaning by sucking dust or foreign substances from a floor while travelling autonomously in an area to be cleaned without a user's operation. The mobile robot detects the distance to obstacles, such as furniture, office supplies, walls, and the like, which are installed in an area to be cleaned, and based on the detection, the mobile robot performs mapping of the area to be cleaned, or bypasses the obstacles by controlling driving of the left and right wheels.

In the existing technology, a travelling distance of the mobile robot is measured by a sensor, which faces the ceiling or floor, and the distance to an obstacle is calculated based on the measurement. However, the distance to an obstacle based on a moving distance of the mobile robot is an indirect measurement, and if the moving distance of the mobile robot is not measured accurately due to an uneven surface of the floor and the like, an error inevitably occurs in the measured distance to the obstacle. Additionally, errors in the measurement of distance may occur when the mobile robot employs infrared or ultrasound, because a significant amount of the emitted light or sound may be diffused by a receiving obstacle.

Korean Laid-open Patent Publication No. 10-2013-0141979 (hereinafter referred to as the '979 disclosure) discloses a mobile robot, which includes a light emitting unit emitting light in a cross pattern, and a camera unit acquiring a forward image of a cleaner. The mobile robot of '979 disclosure has a drawback in that the mobile robot has one light source configured to emit light at a uniform angle, thereby limiting the range of detection of obstacles, and leading to difficulty in identifying stereoscopic shapes of high obstacles. Further, when the mobile robot moves up on a threshold or an obstacle which has a height equal to or lower than a certain height, the main body may be inclined such that an obstacle or cliff may be mistakenly determined, and the mobile robot is confined by an obstacle in a stuck state, preventing the mobile robot from further traveling.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 10 is a diagram illustrating patterned light emitted by a first pattern emission unit illustrated in FIG. 1A;

FIG. 15 is a diagram referred to in the description of a tilt of a main body of a mobile robot according to an exemplary embodiment of the present disclosure;

FIG. 18 is a diagram illustrating a pattern change as the mobile robot illustrated in FIG. 17 enters the slope;

FIG. 20 is a diagram illustrating a pattern change as the mobile robot illustrated in FIG. 19 enters the slope;

DETAILED DESCRIPTION

Figure 1A:
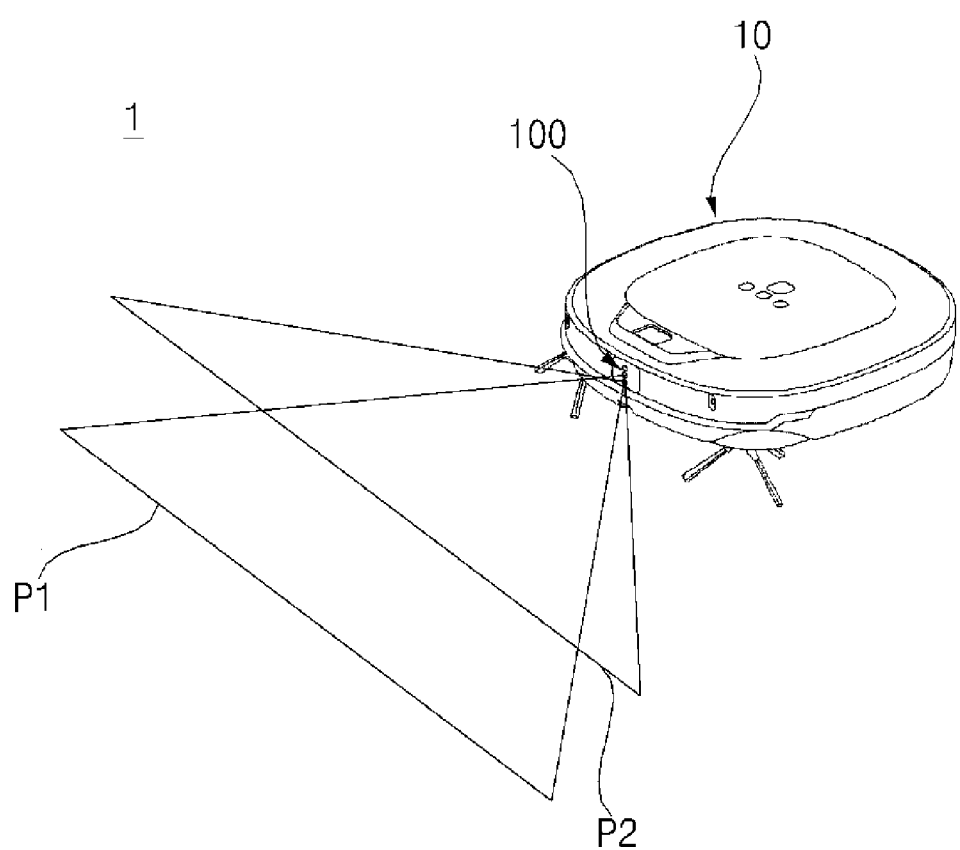
FIG. 1A is a perspective view of a mobile robot according to an exemplary embodiment of the present disclosure.

Referring to FIGS. 1 to 4, the mobile robot 1 according to an exemplary embodiment of the present disclosure includes: a main body 10, which travels over the floor of an area to be cleaned to suck dust or foreign substances from the floor; and an obstacle detection unit 100 provided on a front surface of the main body 10. The main body 10 includes: a casing 11, which forms an exterior of the main body 10 and a space to accommodate components of the main body 10; a suction unit 34 provided at the casing 11 to suck dust, waste, and the like; and a left wheel 36 (L) and a right wheel 36 (R) which are rotatably provided at the casing 11. As the left wheel 36 (L) and the right wheel 36 (R) rotate, the main body 10 travels in the floor of the area to be cleaned, so that the suction unit may suck foreign materials.

The suction unit may include a rotatable cleaning brush 34, a suction fan (not shown) to generate a suction force, and a suction hole 10h, through which air generated by rotation of the suction fan is suctioned. The suction unit 34 may also include: a filter to collect foreign materials from the air suctioned through the suction hole 10h; and a foreign substance collecting container (not shown) where the foreign substances collected from the filter are stored.

Further, the main body 10 may include a travel driving unit to drive the left wheel 36 (L) and the right wheel 36 (R). The travel driving unit may include at least one driving motor. The driving motor may include a left wheel driving motor, which rotates the left wheel 36 (L), and the right wheel driving motor, which rotates the right wheel 36 (R). The left wheel driving motor and the right wheel driving motor are controlled independently from each other by the travel control unit of the controller, such that the main body 10 may move forward or backward, or may turn. For example, in the case where the main body 10 moves forward, the left wheel driving motor and the right wheel driving motor may rotate in the same direction; however, when the left wheel driving motor and the right wheel driving motor may rotate at different speeds or rotate in opposite directions to each other, a traveling direction of the main body 10 may be changed. At least one auxiliary wheel 37 may be further included in the main body 10 to stably support the main body 10.

The main body 10 may be further provided with a plurality of brushes 35, which are positioned at a front bottom portion of the casing 11, and have radially extending bristles with a plurality of wings. As the plurality of brushes 35 rotate, dust may be removed from the floor of the area to be cleaned, and the removed dust is suctioned through the suction hole 10h into the collecting container. A control panel 39 may be provided, which is provided on the top of the casing 11, and receives, from a user, input of various instructions to control the mobile robot 1.

The obstacle detection unit 100 may be provided on a front surface of the main body 10. The obstacle detection unit 100 is fixed at a front surface of the casing 11, and includes a first pattern emission unit (or light source) 120, a second pattern emission unit (or light source) 130, and the image acquisition unit (or camera) 140.

Figure 1B:
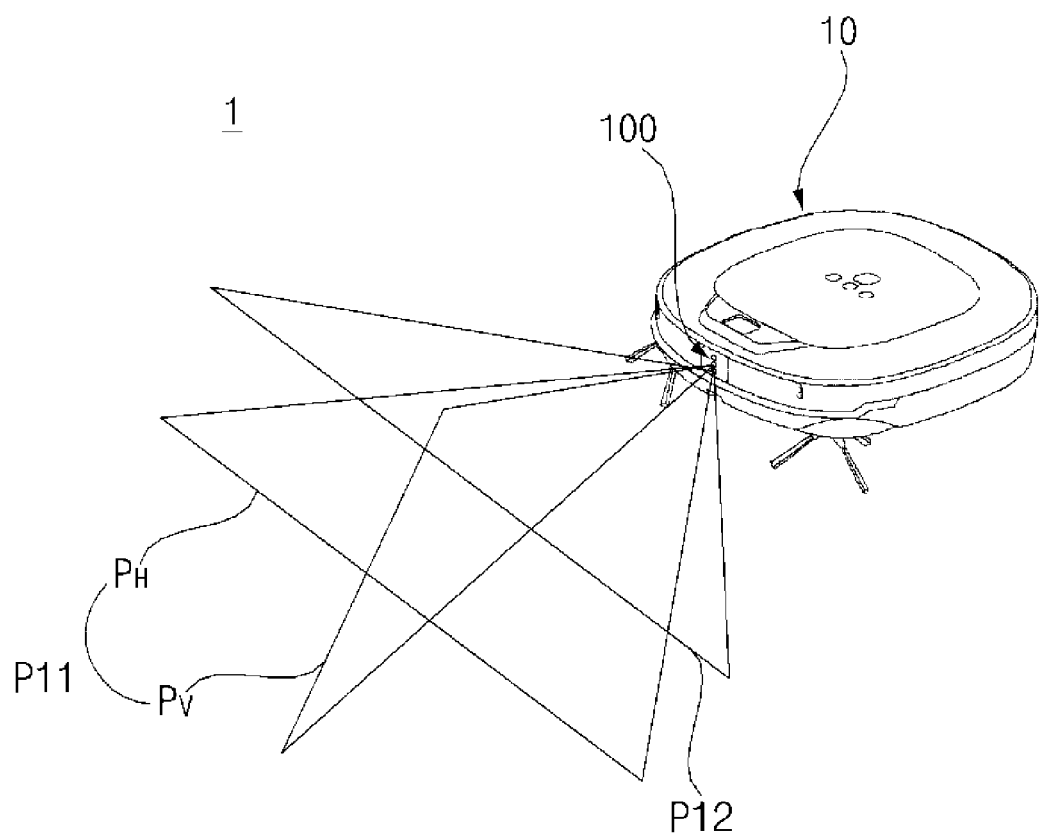
FIG. 1B is a perspective view of a mobile robot according to another exemplary embodiment of the present disclosure.

Patterned light emitted by the first pattern emission unit 120 and patterned light emitted by the second pattern emission unit 130 may be in different patterns as illustrated in FIGS. 1A and 1B. The first pattern emission unit 120 and the second pattern emission unit 130 illustrated in FIGS. 1A and 1B are indicated by the same reference numerals, and the shape of the emitted pattern is not limited to the drawings.

As illustrated in FIG. 1A, the first pattern emission unit 120 emits light in a first pattern P1 (hereinafter referred to as first patterned light) downward and forward from the main body 10. The second pattern emission unit 120 emits light in a second pattern P2 (hereinafter referred to as second patterned light) upward and forward from the main body 10. In the case where the first patterned light P1 and the second patterned light P2 are emitted onto the floor or an obstacle, the first patterned light P1 and the second patterned light P2 each are in a straight-line shape in a horizontal direction.

As illustrated in FIG. 1B, the first pattern emission unit 120 may emit light in an alternative first pattern P11 (hereinafter referred to as alternative first patterned light) downward and forward from the main body 10. Accordingly, the alternative first patterned light P11 may be emitted to the floor of an area to be cleaned. The alternative first patterned light P11 may be in a cross shape formed by intersecting a horizontal line Ph and a vertical line Pv. The second pattern emission unit 120 emits light in an alternative second pattern P12 (hereinafter referred to as alternative second patterned light) upward and forward from the main body 10. The alternative second patterned light P12 is in a straight-line shape in a horizontal direction parallel to the horizontal line Ph of the alternative first patterned light.

Figure 3A:
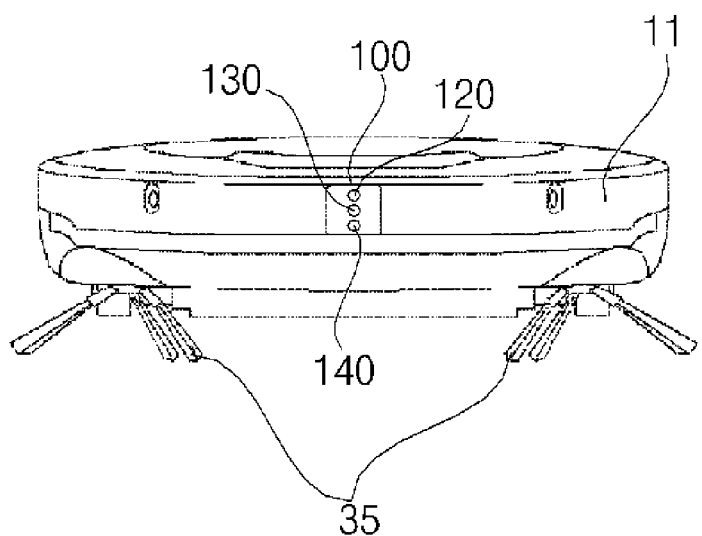
FIG. 3A is a front view of the mobile robot illustrated in FIG. 1A.
Figure 3B:
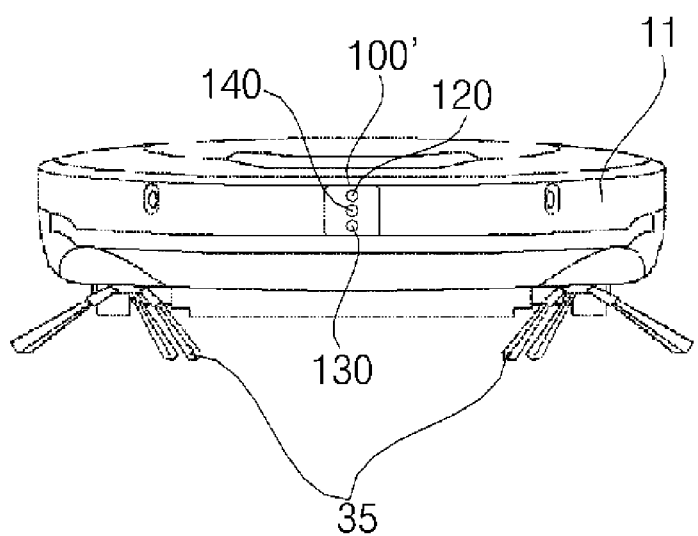
FIG. 3B is a front view of the mobile robot illustrated in FIG. 1B.
Figure 4:
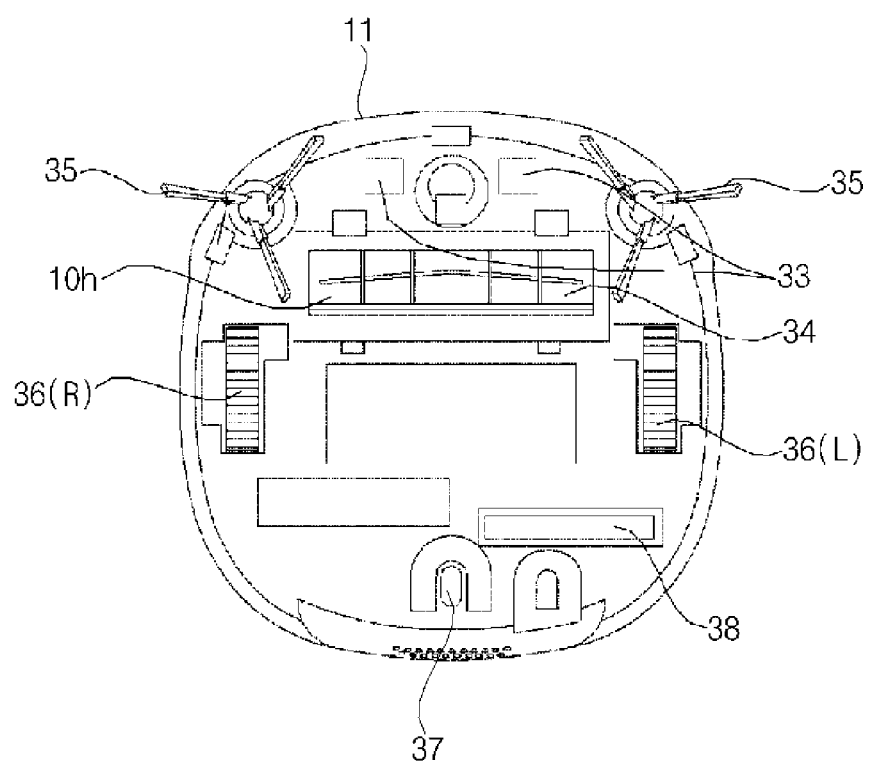
FIG. 4 is a bottom view of the mobile robot illustrated in FIG. 1.

As illustrated in FIG. 3A, the obstacle detection unit 100 according to a first exemplary embodiment includes the image acquisition unit 140 provided in a line below the first pattern emission unit 120 and the second pattern emission unit 130. Further, as illustrated in FIG. 3B, the obstacle detection unit 100' according to a second exemplary embodiment includes the image acquisition unit 140 provided in a line between the first pattern emission unit 120 and the second pattern emission unit 130. The image acquisition unit 140 may be provided at the center therebetween, i.e., the distance from the image acquisition unit 140 to the first pattern emission unit may be identical to the distance from the image acquisition unit 140 to the second pattern emission unit 130. In the obstacle detection unit according to the first and second exemplary embodiments, the shape of patterns emitted by the first pattern emission unit 120 and the second pattern emission unit 130 may be any shape, either the straight-line shape illustrated in FIG. 1A or the cross shape illustrated in FIG. 1B.

The main body 10 may be equipped with a rechargeable battery 38, which is charged by connecting a charging terminal 33 to a commercial power source (for example, power outlet at home), or by docking the main body 10 at a charging station connected to the commercial power source such that the charging terminal may be electrically connected to the commercial power source. Electronic parts included in the mobile robot 1 may be supplied with power from the battery 38. Thus, upon charging the battery 38, the mobile robot 1 may travel autonomously after electrically separating from the commercial power source.

Figure 5:
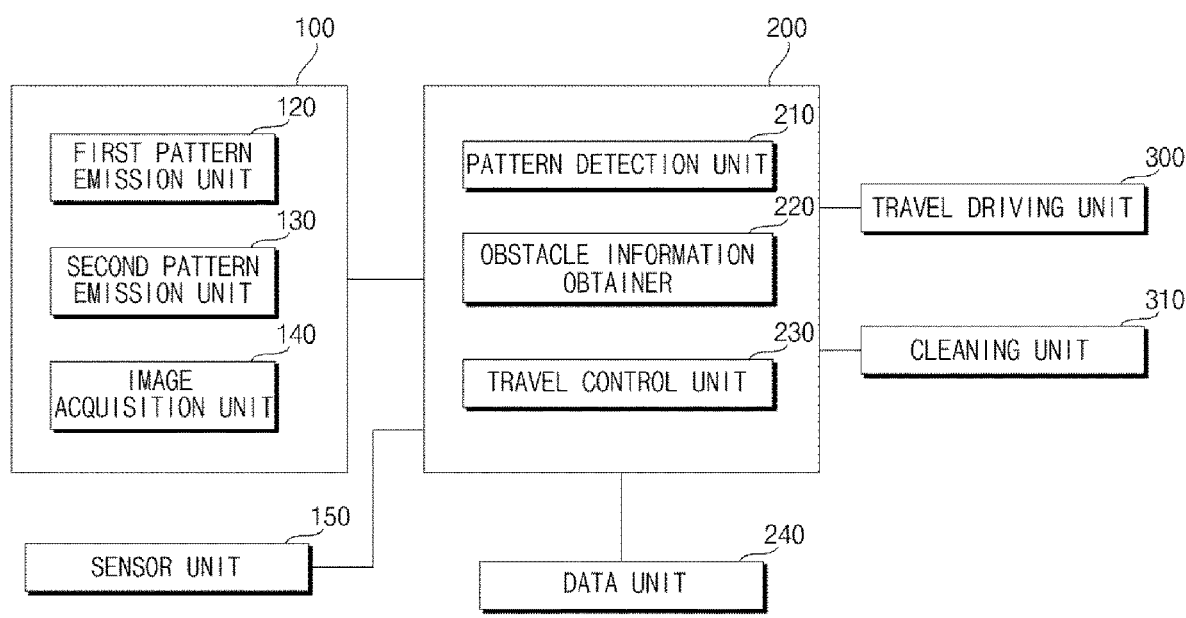
FIG. 5 is a block diagram illustrating main parts of the mobile robot illustrated in FIG. 1.

FIG. 5 is a block diagram illustrating main parts of the mobile robot illustrated in FIG. 1. The mobile robot 1 includes a travel driving unit 300, a cleaning unit 310, a data unit 240, an obstacle detection unit 100, and a controller 200 which controls the overall operation of the mobile robot 1.

The controller 200 and/or other components of the mobile robot 1 may be implemented as one or more processors, or may be implemented as a hardware device The controller 200 may include a travel control unit 230 which controls the travel driving unit 300. The left wheel driving motor and the right wheel driving motor are controlled independently from each other by the travel control unit 230, such that the main body 10 may move forward or rotate. Further, the controller 200 includes a pattern detection unit 210 which detects a pattern by analyzing data input from the obstacle detection unit 100; and an obstacle information obtainer 220 which determines an obstacle based on a pattern.

The pattern detection unit 210 detects optical patterns P1 and P2 from an image (acquired image) acquired by the image acquisition unit 140. Hereinafter, description of the optical pattern will be made by using the first patterned light P1 and the second patterned light P2 illustrated in FIG. 1A, but the description may also be applied to the optical pattern of the alternative first patterned light and the alternative second patterned light illustrated in FIG. 1B.

The pattern detection unit 210 may detect features, such as dots, lines, sides, and the like, of pixels forming the acquired image, and based on the detected features, the pattern detection unit 210 may detect optical patterns P1 and P2, or dots, lines, sides, and the like, of the optical patterns P1 and P2. The obstacle information obtainer 220 determines the presence of an obstacle based on the pattern detected by the pattern detection unit 210, and determines the shape of an obstacle.

The travel driving unit 300 includes at least one driving motor to enable the mobile robot 1 to travel according to a control command of the travel control unit 230. As described above, the travel driving unit 300 may include the left wheel driving motor, which rotates the left wheel 36 (L), and the right wheel driving motor, which rotates the right wheel 36 (R).

The cleaning unit (or controller) 310 operates the brush 34 to facilitate suctioning of dust or foreign substances around the robot cleaner 1, and operates the suction device to suck dust or foreign substances. The cleaning unit 310 controls the suction fan included in the suction unit 34 that suctions foreign materials such as dust or waste, so that dust may be drawn into the foreign material collecting container through the suction hole.

The data unit 240 stores the acquired image input from the obstacle detection unit 100; reference data used for the obstacle information obtainer 220 to determine an obstacle; and obstacle information on the detected obstacle. Further, the data unit 240 may store control data to control the operation of the mobile robot 1; data according to a cleaning mode of the mobile robot 1; and a map generated or received from an external source. In addition, the data unit 240 may store data readable by a microprocessor, and may include Hard Disk Drive (HDD), Solid State Disk (SSD), Silicon Disk Drive (SDD), Read-Only Memory (ROM), Random-Access Memory (RAM), Compact Disk Read Only Memory (CD-ROM), a magnetic tape, a floppy disk, an optical data storage device, etc.

The obstacle detection unit 100 includes the first pattern emission unit 120, the second pattern emission unit 130, and the image acquisition unit 140. As described above, in the obstacle detection unit 100, the first pattern emission unit 120, the second pattern emission unit 130, and the image acquisition unit 140 are provided at a front portion of the main body 10 to emit the first patterned light P1 and the second patterned light P2 forward from the mobile robot 1, and captures and acquires an image of the emitted patterned light.

The controller 200 stores the acquired image in the data unit 240, and the pattern detection unit 210 analyzes the acquired image to extract a pattern. That is, the pattern detection unit 210 extracts an optical pattern obtained by emitting patterned light, which is emitted by the first pattern emission unit or the second pattern emission unit, to a floor or an obstacle. The obstacle information obtainer 220 determines an obstacle based on the extracted optical pattern. The controller 200 determines an obstacle based on the acquired image input from the obstacle detection unit 100, and controls the travel driving unit 300 to change a moving direction or a traveling path to bypass the obstacle while traveling.

In the case where an obstacle is a cliff, the mobile robot 1 may fall off the cliff if the mobile robot continues on path toward the obstacle. Accordingly, the controller 200 detects the cliff from the acquired image, and checks again the cliff by using a cliff sensor (not shown) included therein, so as to control the mobile robot 1 not to fall off the cliff. In response to determination that the obstacle is a cliff, the controller 200 determines a change in pattern based on the acquired image, and controls the travel driving unit 300 to travel along the cliff.

Based on tilt information input from a tilt sensor of a sensor unit 150, the controller 200 determines whether the main body 10 is inclined; and if the main body is inclined, the controller 200 compensates for the tilt relative to a position of the optical pattern of the acquired image. The tilt sensor may include, for example, a clinometer or an inclinometer. In another example, the sensor unit 150 may include an acceleration sensor. In response to the tilt of the main body 10 that is sensed by the sensor unit 150, the obstacle information obtainer 220 performs tilt compensation relative to the optical pattern of the acquired image, and re-determines an obstacle. Once the obstacle information obtainer 220 re-determines the obstacle, the travel control unit 230 determines, based on the redetermination, whether the mobile robot may travel, and sets up a traveling path to control the travel driving unit 300.

Figure 6:
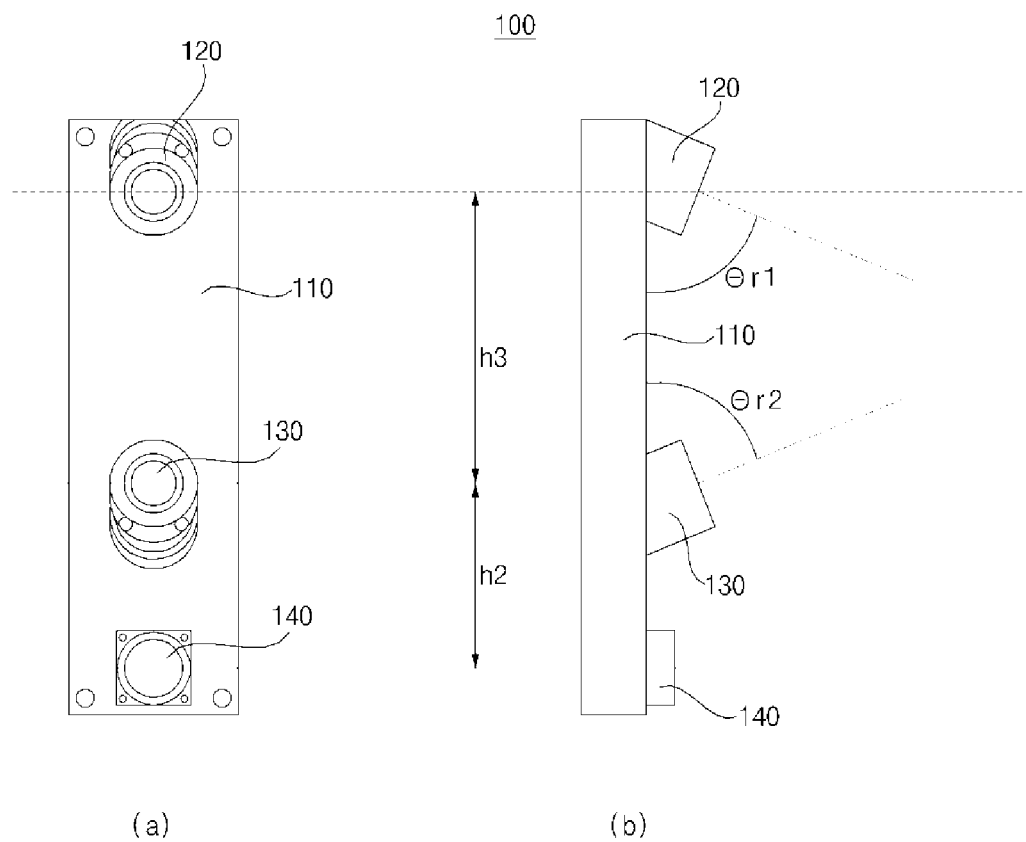
FIG. 6 is a front view and a lateral view of an obstacle detection unit according to a first exemplary embodiment of the present disclosure.

As illustrated in portions (a) and (b) of FIG. 6, in the obstacle detection unit 100 according to the first exemplary embodiment, the first pattern emission unit 120 and the second pattern emission unit 130 each include a light source, and an Optical Pattern Projection Element (OPPE) which generates a predetermined pattern by transmitting light emitted from the light source. The light source may be a laser diode (LD), a light emitting diode (LED), and the like. Laser light has excellent monochromaticity, straightness, and connectivity properties, as compared to other light sources, thereby enabling fine distance measurement. Particularly, since infrared light or visible light has a high deviation in precision in distance measurement according to factors, such as colors and materials of a target object, it is desired to use the laser diode as the light source. The OPPE may include a lens or a diffractive optical element (DOE). Depending on the configuration of the OPPE included in the pattern emission unit 120 and the pattern emission unit 130, light in various patterns may be emitted.

The first pattern emission unit 120 may emit the first patterned light P1 downward and forward from the main body 10. Accordingly, the first patterned light P1 may be emitted to the floor of an area to be cleaned. The first patterned light P1 may be in a horizontal line shape. Further, the first patterned light P1 may also be in a cross shape with a horizontal line intersecting a vertical line.

The first pattern emission unit 120, the second pattern emission unit 130, and the image acquisition unit 140 may be arranged vertically in a line. The image acquisition unit 140 is provided below the first pattern emission unit 120 and the second pattern emission unit 130, but the present disclosure is not limited thereto, and the image acquisition unit 140 may be dispose above the first pattern emission unit 120 and the second pattern emission unit 130.

In the embodiment, the first pattern emission unit 120 is provided on the top and emits the first patterned light P1 downward and forward, so as to detect an obstacle located at a position lower than the first pattern emission unit 120. The second pattern emission unit 130 provided below the first pattern emission unit 120 and emits the second patterned light P2 upward and forward, such that the second patterned light P2 may be emitted onto the wall, or an obstacle located at a position higher than at least the second pattern emission unit 130, or a portion of the obstacle.

The second patterned light P2 may be formed to be different from the first patterned light P1, and may be formed to include a horizontal line. Here, the horizontal line is not necessarily a continuous line segment, and may be formed to be a dotted line.

Figure 2:
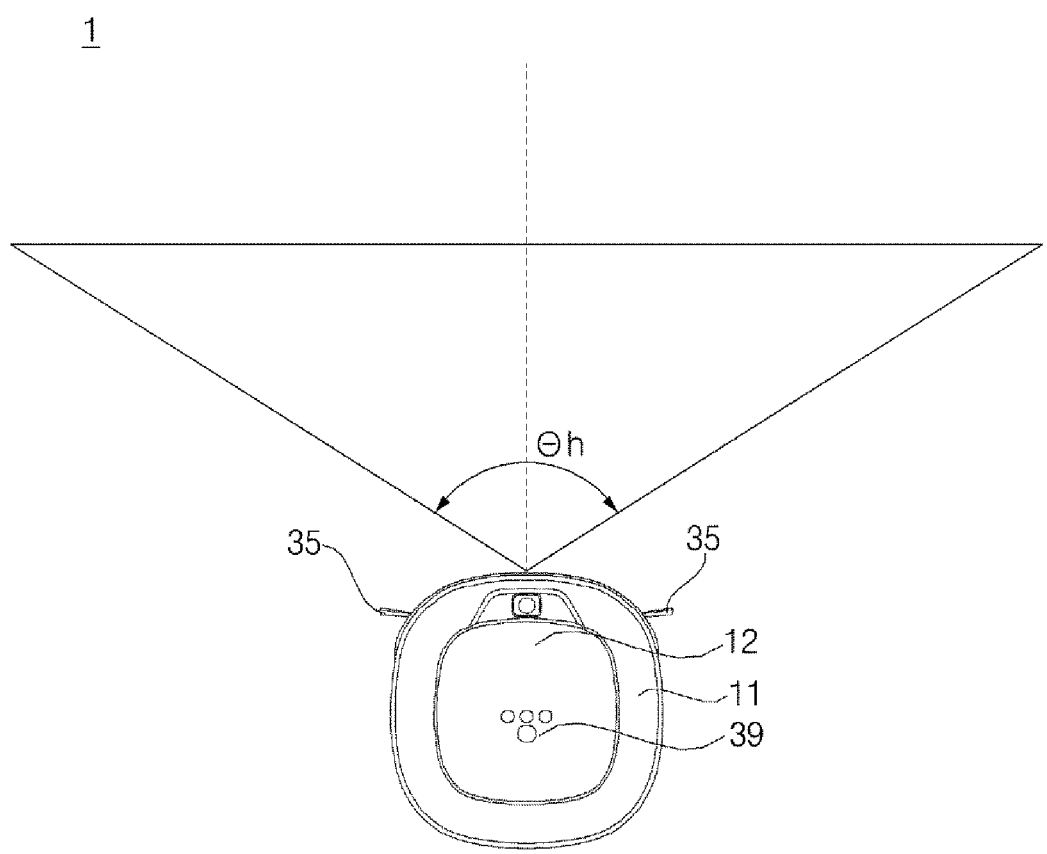
FIG. 2 is a diagram illustrating a horizontal view angle of the mobile robot illustrated in FIG. 1.

As illustrated above in FIG. 2, an emission angle θh is a horizontal emission angle of the first patterned light P1 emitted by the first pattern emission unit 120. The emission angle θh represents an angle formed between both ends of the horizontal line and the first pattern emission unit 120, and is desirably set in a range of 130° to 140°, but is not limited thereto. The dotted line of FIG. 2 represents a direction forward of the mobile robot 1, and the first patterned light P1 may be formed to be symmetrical with respect to the dotted line.

Similarly to the first pattern emission unit 120, a horizontal emission angle of the second pattern emission unit 130 may be desirably set in a range of 130° to 140°, and in some embodiments, the second patterned light P2 may be emitted at the same horizontal emission angle as that of the first pattern emission unit 120. In this case, the second patterned light P2 may also be formed to be symmetrical with respect to the dotted line of FIG. 2.

The image acquisition unit 140 may acquire a forward image of the main body 10. Particularly, the first patterned light P1 and the second patterned light P2 are displayed on the image (hereinafter referred to as an acquired image) acquired by the image acquisition unit 140, in which images of the first patterned light P1 and the second patterned light P2 displayed on the acquired image will be hereinafter referred to as optical patterns; and as the optical patterns are images, projected on the image sensor, of the first patterned light P1 and the second patterned light P2 incident on an actual space, the same reference numerals as the first patterned light P1 and the second patterned light P2 will be given to a first optical pattern P1, which corresponds to the first patterned light P1, and a second optical pattern P2, which corresponds to the second patterned light P2.

The image acquisition unit 140 may include a digital camera, which converts an image of a subject into an electric signal, converts the electric signal into a digital signal, and then stores the digital signal in a memory device. The digital camera includes an image sensor (not shown) and an image processor (not shown).

The image sensor is a device that converts an optical image into an electrical signal, and is formed as a chip having a plurality of photodiodes integrated therein. For example, the photodiodes may be pixels. When light, having passed through the lens, forms an image on the chip, charges are accumulated in the respective pixels constructing the image, and the charges accumulated in the pixels are converted into an electrical signal (for example, voltage). As is well known, a Charge Coupled Device (CCD), a Complementary Metal Oxide Semiconductor (CMOS), and the like, may be used as the image sensor.

The image processor generates a digital image based on an analog signal output from the image sensor. The image processor includes: an A/D converter to convert the analog signal into a digital signal; a buffer memory to temporarily store digital data according to the digital signal output from the A/D converter; and a digital signal processor (DSP) to generate a digital image by processing the data stored in the buffer memory.

The pattern detection unit 210 may detect features, such as dots, lines, sides, and the like, of pixels in the acquired image, and based on the detected features, the pattern detection unit 210 may detect optical patterns P1 and P2, or dots, lines, sides, and the like, of the optical patterns P1 and P2.

For example, the pattern detection unit 210 may extract line segments formed by consecutive pixels that are brighter than neighboring pixels, so as to extract a horizontal line, which forms the first optical pattern P1, and a horizontal line which forms the second optical pattern P2.

However, the pattern extraction method is not limited thereto, and various methods of extracting a desired pattern are already known in the art, which may be used by the pattern detection unit 210 to extract the first optical pattern P1 and the second optical pattern P2.

Figure 7:
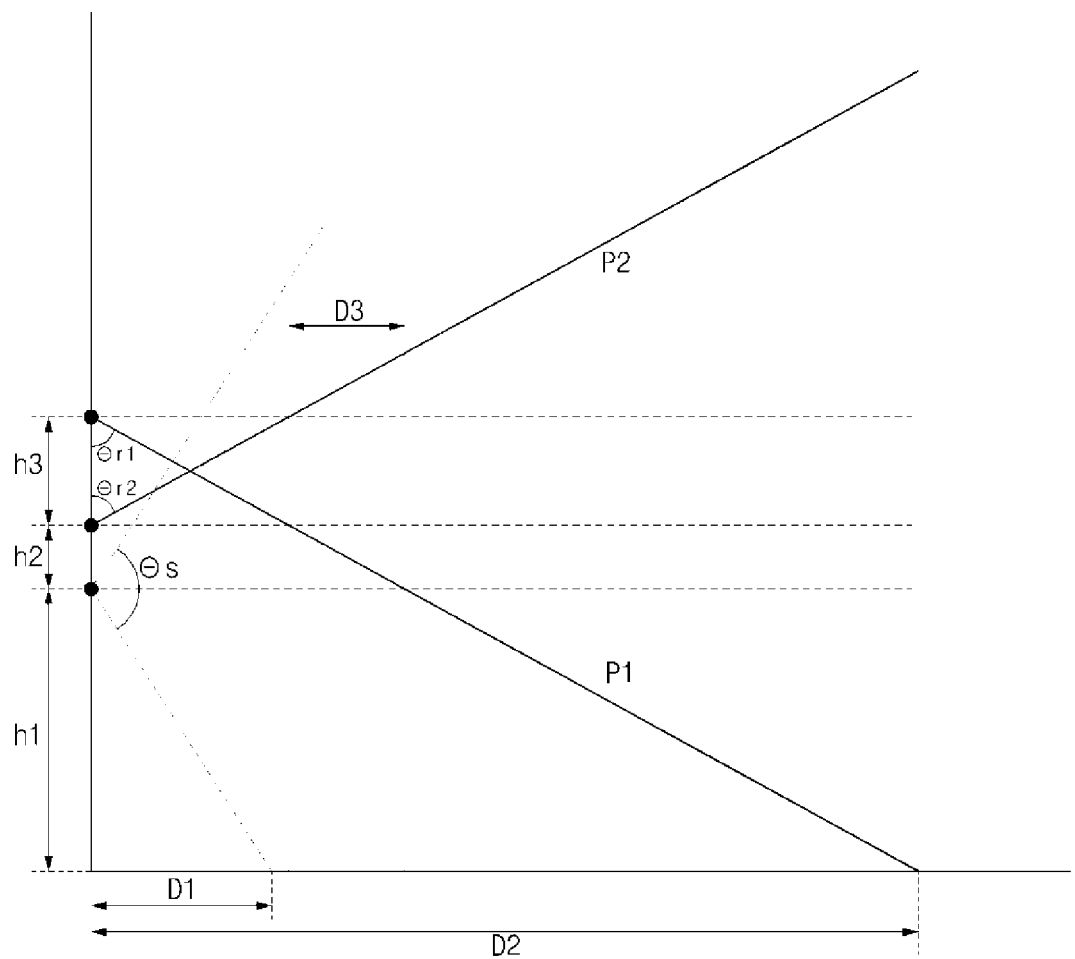
FIG. 7 is a diagram illustrating a pattern emission range and an obstacle detection range of the obstacle detection unit illustrated in FIG. 6.

As illustrated in FIG. 7, the first pattern emission unit 120 and the second pattern emission unit 130 may be provided symmetrical to each other. The first pattern emission unit 120 and the second pattern emission unit 130 are vertically spaced apart from each other by a distance h3, in which the first pattern emission unit 120 emits the first patterned light downward, and the second pattern emission unit emits the second patterned light upward, such that the first patterned light intersects the second patterned light.

The image acquisition unit 140 is provided below the second pattern emission unit 130 and is spaced apart therefrom by a distance h2, and captures a forward image of the main body 10 at a view angle of θs with respect to a vertical direction. The image acquisition unit 140 is installed at a position spaced apart from a bottom surface by a distance h1. In consideration of a bumper (not shown) formed at the front bottom end of the main body 10 of the mobile robot 1, or a shape of structure for traveling or cleaning, the image acquisition unit 140 is desirably installed at a position that does not interrupt photographing of a forward image.

The first pattern emission unit 120 or the second pattern emission unit 130 is installed such that an optical axis of lenses included in the pattern emission unit 120 and the pattern emission unit 130 is oriented to form a constant emission angle. The first pattern emission unit 120 emits the first patterned light P1 downward at a first emission angle θr1; and the second pattern emission unit 130 emits the second patterned light P2 at a second emission angle θr2. In this case, the first emission angle and the second emission angle are generally different from each other, but may be identical to each other in some cases. The first emission angle and the second emission angle are desirably set in a range of 50° to 75°, but are not limited thereto. For example, the first emission angle may be set in a range of 60° to 70°, and the second emission angle in a range of 50° to 55°. The emission angle may be changed depending on the structure of a bumper at a lower portion of the mobile robot 1, a lower object detection distance, and the height of an upper portion to be detected.

When the patterned light, which is emitted by the first pattern emission unit 120 and/or the second pattern emission unit 130, is incident on an obstacle, the positions of the optical patterns P1 and P2 vary depending on the distance between the obstacle and the first pattern emission unit 120. For example, when the first patterned light P1 and the second patterned light P2 are incident on a specific obstacle, as the obstacle is located closer to the mobile robot 1, the first optical pattern P1 is displayed at a higher position in the acquired image, whereas the second optical pattern P2 is displayed at a lower position. That is, data on distances to obstacles is stored in advance, the data corresponding to a row of pixels (line of pixels arranged in a transverse direction) forming an image generated by the image acquisition unit 140, and when the optical patterns P1 and P2, detected from the image acquired by the image acquisition unit 140, are detected in a specific row, the location of an obstacle may be estimated based on the data on distances to obstacles corresponding to the row.

The image acquisition unit 140 is arranged such that the optical axis of the lens is oriented in a horizontal direction, and θs illustrated in FIG. 7 indicates an angle of view, and is set at a value equal to or higher than 100°, preferably in a range of 100° to 110°, but is not limited thereto. Further, the distance from the floor of an area to be cleaned to the image acquisition unit 140 may be set in a range of approximately 60 mm to 70 mm. In this case, in the image acquired by the image acquisition unit 140, the floor of the area to be cleaned is displayed after D1, and on the floor displayed on the acquired image, D2 is a position where the first optical pattern P1 is displayed. In this case, when there is an obstacle at D2, an image of the obstacle, on which the first patterned light P1 is incident, may be acquired by the image acquisition unit 140. In the case where an obstacle is closer to the mobile robot 1 than D2, the first optical pattern, corresponding to the emitted first patterned light P1, is displayed at a higher position than a reference position ref1.

The reference position ref1 is a position where the first optical pattern is displayed when the main body 10 is placed on a flat surface. When the first optical pattern is emitted to D2, the image acquisition unit 140 may be set as a position where the first optical pattern is captured. The reference position ref1 is a reference to determine a normal state, i.e., a state where there is no obstacle in front of the main body 10 and the floor is a flat surface.

Here, the distance from the main body 10 to D1 is preferably in a range of 100 mm to 150 mm; and the distance from the main body 10 to D2 is preferably in a range of 180 mm to 280 mm, but the distance is not limited thereto. D3 indicates a distance from the most protruding part of the front surface of the main body 10 to a position where the second patterned light is incident. The main body 10 detects an obstacle while moving, such that D3 is a minimum distance required to allow the main body 10 to detect an obstacle, located forward (upward) of the main body 10, without colliding with the obstacle. In the case where the first optical pattern P1 was once displayed on the acquired image, and then disappears in a normal state while the main body 10 travels, or the first optical pattern is only partially displayed, the obstacle information obtainer 220 determines that there is a cliff near the mobile robot 1.

In the case where the first optical pattern is not displayed on the acquired image, the obstacle information obtainer 220 may identify a cliff located in front of the mobile robot 1. In the case where there is a cliff (for example, stairs) in front of the mobile robot 1, the first patterned light is not incident onto the floor, such that the first optical pattern P1 disappears from the acquired image.

Based on a length of D2, the obstacle information obtainer 220 may determine that there is a cliff in front of the main body 10 at a position spaced apart from the main body 10 by D2. In this case, when the first patterned light P1 is in a cross shape, only the vertical line is displayed without the horizontal line, such that the obstacle information obtainer 220 may determine the cliff.

Further, in the case where a portion of the first optical pattern is not displayed, the obstacle information obtainer 220 may determine that there is an obstacle on the left side or the right side of the mobile robot 1. In the case where a portion of the right side of the first optical pattern is not displayed, the obstacle information obtainer 220 may determine that the cliff is located on the right side thereof. Accordingly, based on the identified cliff information, the travel control unit 230 may control the travel driving unit 300 so that the mobile robot 1 may travel along a path that does not lead to the cliff.

In addition, in the case where there is a cliff in front of the mobile robot 1, the travel control unit 230 may control the mobile robot 1 to move forward a distance, for example, the distance D2 or a distance shorter than the distance D2, to identify again the presence of a cliff by using a cliff sensor installed on the bottom of the main body 10. The mobile robot 1 may first identify a cliff based on the acquired image, and then may identify the cliff a second time by using the cliff sensor after traveling a predetermined distance.

Figure 8:
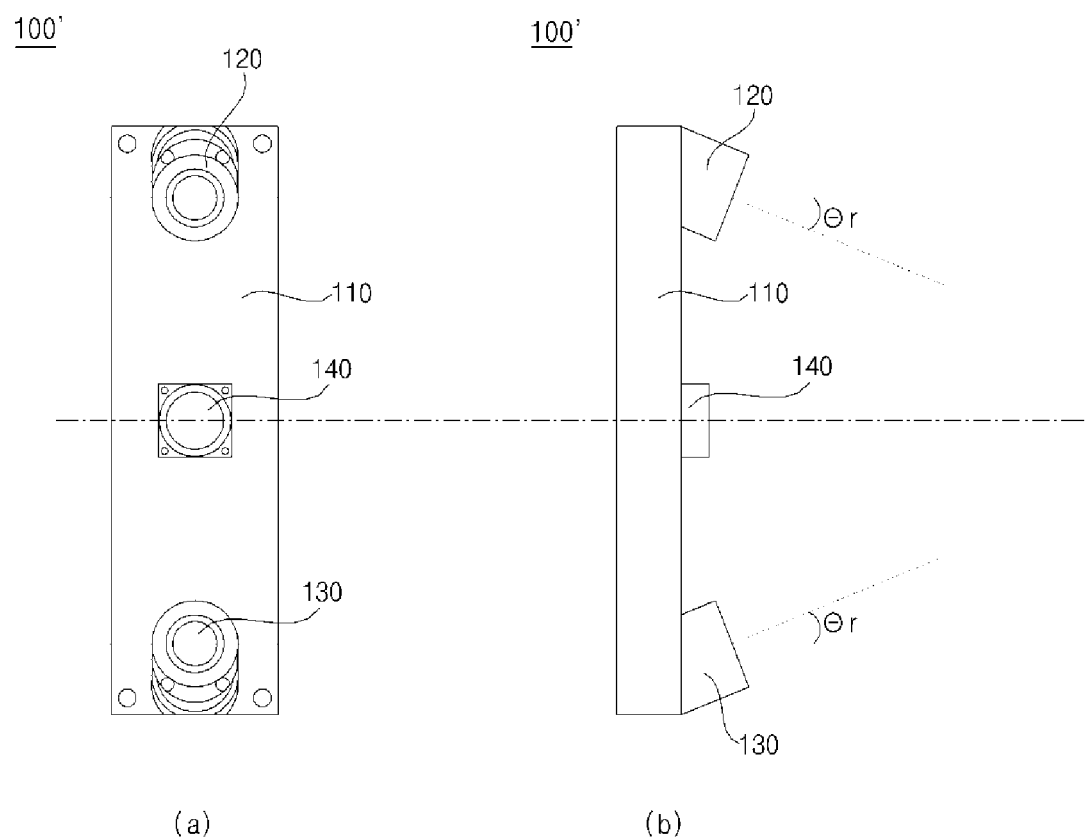
FIG. 8 is a front view and a lateral view of an obstacle detection unit according to a second exemplary embodiment of the present disclosure.
Figure 9:
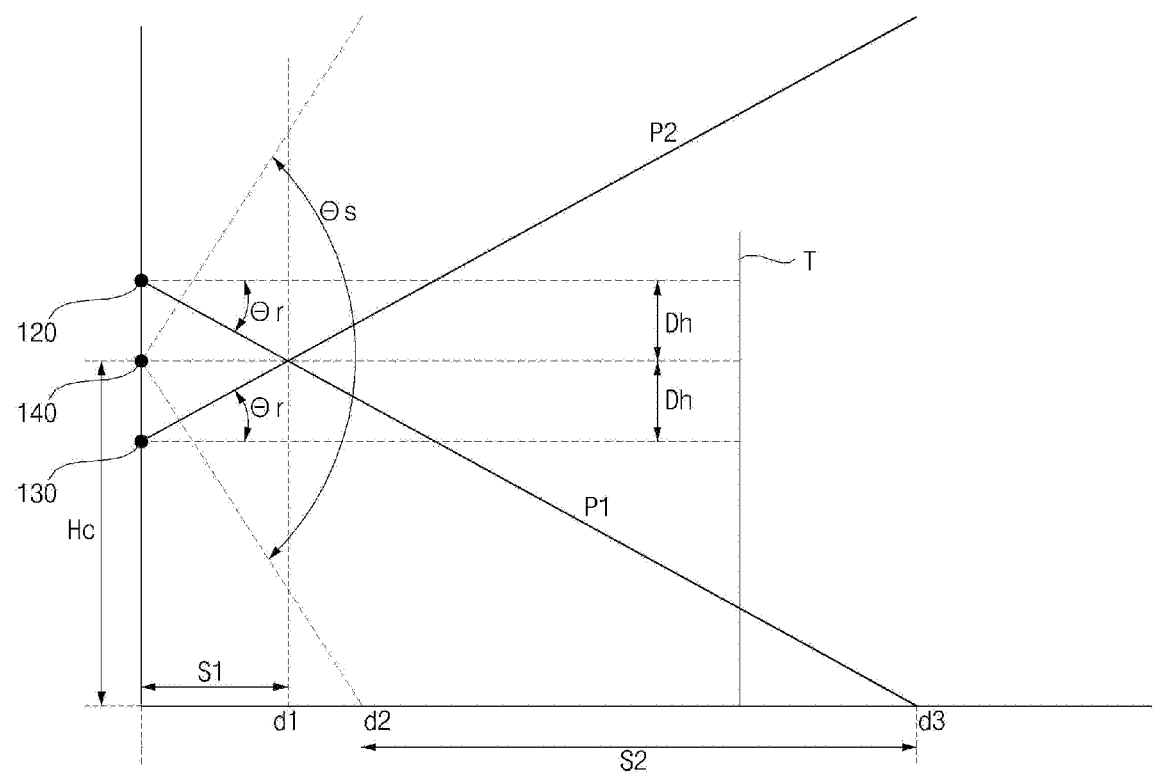
FIG. 9 is a diagram illustrating a pattern emission range and an obstacle detection range of the obstacle detection unit illustrated in FIG. 8.

FIG. 8 is a front view and a lateral view of an obstacle detection unit according to a second exemplary embodiment of the present disclosure; and FIG. 9 is a diagram illustrating a pattern emission range and an obstacle detection range of the obstacle detection unit illustrated in FIG. 8. As illustrated in portions (a) and (b) of FIG. 8, an obstacle detection unit 100' according to the second exemplary embodiment includes a first pattern emission unit 120, a second pattern emission unit 130, and an image acquisition unit 140. The same reference numerals will be used to indicate the same elements as those of the obstacle detection unit 100 according to the first exemplary embodiment, and description of the same elements will be omitted.

The obstacle detection unit 100' may further include a module frame 110 which is fixed at a front portion of the casing 11 and is vertically elongated, but in some embodiments, the first pattern emission unit 120, the second pattern emission unit 130, and/or the image acquisition unit 140 may be directly fixed to the casing 11 without the module frame 110. In the obstacle detection unit 100' according to the second exemplary embodiment, the first pattern emission unit 120, the image acquisition unit 140, and the second pattern emission unit 130 may be arranged in a line. In this case, the image acquisition unit 140 is desirably interposed between the first pattern emission unit 120 and the second pattern emission unit 130.

The first pattern emission unit 120, which is provided at the top, emits the first patterned light downward and forward from the main body 10; and the second pattern emission unit 130, which is provided at the bottom, emits the second patterned light upward and forward from the main body 10. The first patterned light P1 may be emitted to the floor of an area to be cleaned. The second patterned light P2 may be emitted to an obstacle located at a position higher than at least the second pattern emission unit 130 from the floor of the area to be cleaned, or may be emitted to a portion of the obstacle.

The image acquisition unit 140 may acquire a forward image of the main body 10. Particularly, the first patterned light P1 and the second patterned light P2 are displayed on the image (hereinafter referred to as an acquired image) acquired by the image acquisition unit 140, in which images of the first patterned light P1 and the second patterned light P2 displayed on the acquired image will be hereinafter referred to as optical patterns; and as the optical patterns are images, projected on the image sensor, of the first patterned light P1 and the second patterned light P2 incident on an actual space, the same reference numerals as the first patterned light P1 and the second patterned light P2 will be given to a first optical pattern P1, which corresponds to the first patterned light P1, and a second optical pattern P2, which corresponds to the second patterned light P2.

As illustrated in FIG. 9, in the obstacle detection unit 100' according to the second exemplary embodiment, the first pattern emission unit 120 may be provided above the image acquisition unit 140 at a position spaced apart from the image acquisition unit 140 by a distance Dh; and the second pattern emission unit 130 may be provided below the image acquisition unit 140 at a position spaced apart from the image acquisition unit 140 by the same distance Dh. An angle formed between a horizontal line and the emission direction of the first pattern emission unit 120 or the second pattern emission unit 130 will be defined as a vertical emission angle. Specifically, the vertical emission angle may be defined as an angle formed between a horizontal line and the direction of the optical axis of lenses included in each of the pattern emission units 120 and 130.

A first vertical emission angle of the first pattern emission unit 120 and a second vertical emission angle of the second pattern emission unit 130 may have the same value of $\theta r$. The first pattern emission unit 120 emits the first patterned light P1 at a downward angle $\theta r$ with respect to the horizontal line; and the second pattern emission unit 130 emits the second patterned light P2 at an upward angle $\theta r$ with respect to the horizontal line. The angle $\theta r$ is preferably set in a range of 20° to 30°, but is not limited thereto.

As described above, the first pattern emission unit 120 and the second pattern emission unit 130 are provided to be symmetrical to each other with the image acquisition unit 140 interposed therebetween, and the first pattern emission unit 120 and the second pattern emission unit 130 are configured to emit light at the same vertical emission angle $\theta r$, but in opposite directions.

Such symmetrical structure allows for easy calibration or initialization of a product. In the case where the patterned light, emitted by the first pattern emission unit 120 or the second pattern emission unit 130, is incident on an obstacle, positions of the optical patterns P1 and P2 may vary depending on the distance from the obstacle to the first pattern emission unit 120. For example, when the first patterned light P1 and the second patterned light P2 are incident on a specific obstacle, as the obstacle is located closer to the mobile robot 1, the first optical pattern P1, particularly a horizontal line pattern Ph, is displayed at a higher position on the acquired image, whereas the second optical pattern P2 is displayed at a lower position. That is, data on distances to obstacles is stored in advance, the data corresponding to a row of pixels (line of pixels arranged in a transverse direction) forming an image generated by the image acquisition unit 140, and when the optical patterns P1 and P2, detected from the image acquired by the image acquisition unit 140, are detected in a specific row, the location of an obstacle may be estimated based on the data on distances to obstacles corresponding to the row.

However, in order to perform such process precisely, it is a prerequisite to arrange the first pattern emission unit 120 and the second pattern emission unit 130 to precisely emit light at a predetermined vertical emission angle $\theta r$. Such prerequisite may be checked during calibration. The calibration process may be performed as follows. The obstacle detection unit 100' is fixed, and an incident plate T (see FIG. 7) having a plane surface is vertically provided in front of the obstacle detection unit 100' with a predetermined distance therebetween. The incident plate T is desirably located at a position where the first patterned light P1 may be incident.

Subsequently, light is emitted by the first pattern emission unit 120, and an image is acquired by the image acquisition unit 140. The acquired image has the first optical pattern P1 incident on the incident plate T. In this case, the distance from the obstacle detection unit 100 to the incident plate T is already known, such that in the case where the obstacle detection unit 100' is normally manufactured without fault, a horizontal line Ph of the first optical pattern P1 is required to be displayed at a designated position ref1 (hereinafter referred to as a reference position) on the acquired image.

An emission direction of the second pattern emission unit 130 may be checked by inverting the obstacle detection unit 100' so that the obstacle detection unit 100' is upside down, and then by repeating the above-described calibration process. That is, after the obstacle detection unit 100' is inverted, and the second pattern emission unit 130 is located above the image acquisition unit 140, the second pattern emission unit 130 emits light, and the image acquisition unit 140 acquires an image, in which the second optical pattern P2 projected on the incident plate T is displayed. In this case, if the second pattern emission unit 130 is in a normal condition, the second optical pattern P2 will be detected at the reference position ref1. The image acquisition unit 140 is arranged such that the optical axis of the lens is oriented in a horizontal direction, and $\theta s$ indicates an angle of view of the image acquisition unit 140, and is set at a value equal to or higher than 100°, preferably in a range of 100° to 110°, but is not limited thereto. Such calibration process is also applied to the obstacle detection unit 100 according to the first exemplary embodiment in which the image acquisition unit 140 is positioned under the first pattern emission unit 130 and the second pattern emission unit 130, as shown in FIG. 6.

Further, the distance from the floor of an area to be cleaned to the image acquisition unit 140 may be set in a range of approximately 145 mm to 155 mm. In this case, in the image acquired by the image acquisition unit 140, the floor of the area to be cleaned is displayed after a point indicated as D2, and on the floor displayed in the acquired image, S2 is a region from the center of the first optical pattern P1 (a point where the horizontal line Ph and the vertical line Pv intersect) to D3. Particularly, in the case where there is an obstacle in the region S2, the image acquisition unit 140 may acquire an image of the first patterned light P1 which is incident on the obstacle. In this case, the distance from the main body 10 to D2 is preferably set in a range of 100 mm to 120 mm, and D3 is located at a position spaced apart from the mobile robot 1 by approximately 400 mm, but is not limited thereto.

Further, S1 (region extending from the mobile robot 1 to D1) illustrated in FIG. 9 indicates a region where the position of the first optical pattern P1 and the position of the second optical pattern P2 are upside down. In the case where there is an obstacle in the region S1, the first patterned light P1 is located above the second patterned light P2 in the acquired image, in which D1 is located at a position spaced apart from the mobile robot 1 desirably by 70 mm to 80 mm, but is not limited thereto.

FIG. 10 is a diagram illustrating light emitted by a first pattern emission unit illustrated in FIG. 1A. Once an acquired image is input, the pattern detection unit 210 detects the first optical pattern or the second optical pattern from the acquired image input by the image acquisition unit 140, and transmits the detected first optical pattern or second optical pattern to the obstacle information obtainer 220. The obstacle information obtainer 220 analyzes the first optical pattern or second optical pattern, which is detected from the acquired image, and compares the position of the first optical pattern with the reference position ref1 to determine an obstacle.

As illustrated in portion (a) of FIG. 10, in the case where the horizontal line of the first optical pattern P1 is below the reference position 1, the obstacle information obtainer 220 determines that the mobile robot is in a normal state. The normal state refers to a state where the floor is flat and even, and there is no obstacle in front of the mobile robot, such that the mobile robot continues traveling. In the case where there is an obstacle in front of the mobile robot, the second optical pattern P2 is incident on the obstacle and is displayed on the acquired image, such that in a normal state, the second optical pattern P2 is generally not displayed.

As illustrated in portion (b) of FIG. 10, in the case where the horizontal line of the first optical pattern P1 is above the reference position ref1, the obstacle information obtainer 220 determines that there is an obstacle in front of the mobile robot. In the case where an obstacle is detected by the obstacle information obtainer 220 as illustrated in FIG. 10, the travel control unit 230 controls the travel driving unit 300 to bypass the obstacle while traveling. The obstacle information obtainer 220 may determine the position and size of the detected obstacle based on the positions of the first optical pattern P1 and the second optical pattern P2, and whether the second optical pattern P2 is displayed. In addition, the obstacle information obtainer 220 may determine the position and size of the obstacle based on a change in the first optical pattern and the second optical pattern displayed on the acquired image while traveling.

The travel control unit 230 may determine whether to continue traveling or bypass an obstacle based on the input information on the obstacle, and may control the travel driving unit 300 based on the determination. For example, in the case where the height of an obstacle is lower than a predetermined height, or in the case where it is passable through a space between an obstacle and a floor, the travel control unit 230 determines that it is possible to continue traveling.

As illustrated in portion (c) of FIG. 10, the first optical pattern P1 may be displayed at a lower position than the reference position ref1. In the case where the first optical pattern P1 is displayed at a lower position than the reference position ref1, the obstacle information obtainer 220 determines that there is a downhill slope. In the case where there is a cliff, the first optical pattern P1 disappears, such that a downhill slope may be differentiated from a cliff.

In the case where the first optical pattern is not displayed as illustrated in portion (d) of FIG. 10, the obstacle information obtainer 220 determines that there is an obstacle in a traveling direction. Further, in the case where a portion of the first optical pattern is not displayed as illustrated in portion (e) of FIG. 10, the obstacle information obtainer 220 may determine that there is a cliff on the left side or the right side of the main body 10. In the embodiment, the obstacle information obtainer 220 determines that there is a cliff on the left side of the main body 10. Moreover, in the case where the first optical pattern P1 is in a cross shape, the obstacle information obtainer 220 may determine an obstacle by considering both the position of the horizontal line and the length of the vertical line.

Figure 11:
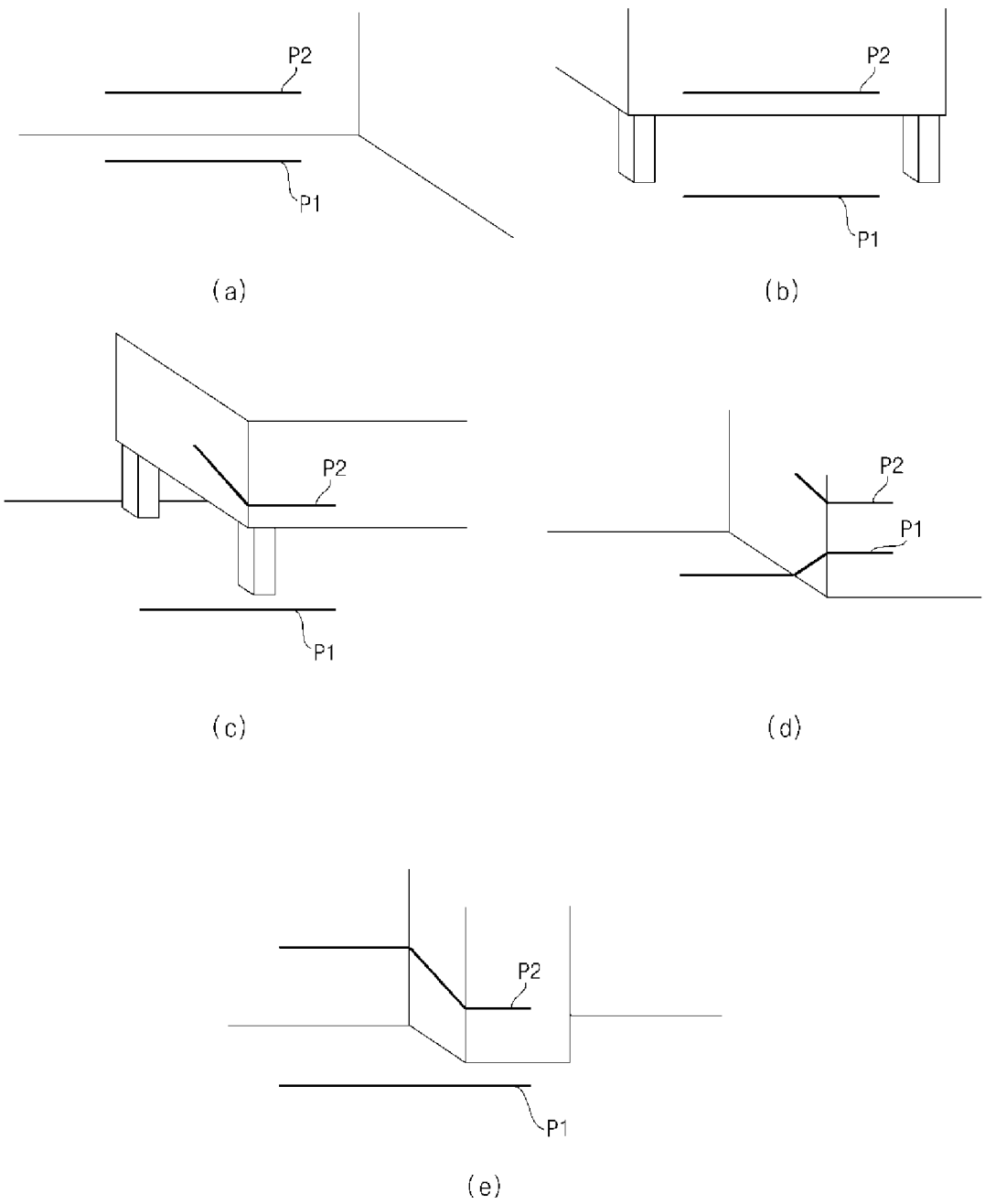
FIG. 11 is a diagram illustrating an example of a shape of a pattern emitted onto an obstacle of the mobile robot illustrated in FIG. 1A.

FIG. 11 is a diagram illustrating an example of a shape of a pattern emitted onto an obstacle of the mobile robot illustrated in FIG. 1A. As illustrated in FIG. 11, the obstacle information obtainer 220 may determine the location, size, and shape of an obstacle in such a manner that the patterned light, emitted by the obstacle detection unit 100, is incident on the obstacle, and an image displaying the optical pattern is acquired.

In the case where there is a wall in front of the mobile robot while traveling, as illustrated in portion (a) of FIG. 11, the first patterned light is incident on the floor, and the second patterned light is incident on the wall. Accordingly, the first optical pattern P1 and the second optical pattern P2 are displayed as two horizontal lines on the acquired image. In the case where the distance between the main body 10 and the wall is longer than D2, the first optical pattern P1 is displayed on the reference position ref1, but the second optical pattern is also displayed, such that the obstacle information obtainer 220 may determine that there is the obstacle.

In the case where the main body 10 moves closer to the wall, with the distance therebetween being less than D2, the first patterned light is incident not on the floor but on the wall, such that the first optical pattern is displayed on the acquired image at a position higher than the reference position ref1, and the second optical pattern is displayed above the first optical pattern. As the main body 10 moves closer to the obstacle, the second optical pattern is displayed at a lower position, such that the second optical pattern is displayed at a lower position compared to the case where the distance between the wall and the main body 10 is longer than D2; but the second patterned light is displayed above the reference position ref1 than the first optical pattern. Accordingly, the obstacle information obtainer 220 may calculate the distance from the main body 10 to the wall, which is an obstacle, based on the first optical pattern and the second optical pattern.

As illustrated in portion (b) of FIG. 11, in the case where there is an obstacle such as a bed, chest of drawers, and the like, the first patterned light P1 and the second patterned light P2 are incident on the floor and the obstacle respectively, as two horizontal lines. The obstacle information obtainer 220 determines the obstacle based on the first optical pattern and the second optical pattern. Based on the position of the second optical pattern, and a change of the second optical pattern, which is shown while the main body approaches the obstacle, the obstacle information obtainer 220 may determine a height of the obstacle. Then, the travel control unit 230 determines whether it is passable through a space below the obstacle, to control the travel driving unit 300 based on the determination.

For example, in the case where there is an obstacle, such as a bed, in an area to be cleaned, in which a space is formed between the obstacle and the floor, the travel control unit 230 may recognize the space, and may determine whether to pass through or bypass the obstacle by identifying the height of the space. In response to determination that the height of the space is less than the height of the main body 10, the travel control unit 230 may control the travel driving unit 300 so that the main body 10 may bypass the obstacle while traveling. By contrast, in response to determination that the height of the space is greater than the height of the main body 10, the travel control unit 230 may control the travel driving unit 300 so that the main body 10 may enter or pass through the space.

While the first optical pattern and the second optical pattern are also displayed as two horizontal lines in portion (a) of FIG. 11, the obstacle information obtainer 220 may differentiate the horizontal lines illustrated in portion (a) of FIG. 11 and the horizontal lines illustrated in portion (b) of FIG. 11, as the distance between the first optical pattern and the second optical pattern is different. As illustrated in portion (a) of FIG. 11, as the main body 10 gets closer to an obstacle, the first optical pattern is displayed at a position higher than the reference position. However, as illustrated in portion (b) of FIG. 11, in the case of an obstacle located at a higher position, although the main body 10 moves closer to an obstacle by a predetermined distance, the first optical pattern P1 is displayed at the reference position ref1, and the position of the second optical pattern P2 is changed, such that the obstacle information obtainer 220 may differentiate the types of obstacle.

As illustrated in portion (c) of FIG. 11, in the case where an obstacle is a corner of a bed or chest of drawers, the first patterned light P1 is emitted to the floor as a horizontal line; and the second patterned light P2 is emitted to the corner of the obstacle, with a portion thereof being displayed as a horizontal line, and the remaining portion being incident on the obstacle and displayed as an oblique line. As the main body 10 moves further away from the obstacle, the second optical pattern is displayed at a higher portion, such that when the second patterned light P2 is incident on the side of the obstacle, the second optical pattern is displayed as an oblique line bending to an upper side than the horizontal line displayed in the case of emission to the front portion.

As illustrated in portion (d) of FIG. 11, in the case where the main body 10 moves closer to the corner of the wall by more than a predetermined distance, a portion of the first patterned light P1 is displayed as the horizontal line at a position higher than the reference position; a portion of the first patterned light P1 is emitted to the side of the corner, and is displayed as an oblique line bending to a lower side; and with respect to the floor, the first patterned light P1 is displayed as a horizontal line.

As illustrated in portion (c) of FIG. 11, the second patterned light is displayed as a horizontal line and a portion of the second patterned light P1 emitted to the side of the corner is displayed as an oblique line bending to an upper portion.

Further, as illustrated in portion (e) of FIG. 11, with respect to an obstacle projecting from the surface of a wall, the first optical pattern is displayed as a horizontal line at the reference position ref1; and a portion of the second optical pattern P2 emitted on the projecting surface is displayed as a horizontal line, another portion thereof emitted to the side of the projecting surface is displayed as an oblique line bending to an upper side, and a remaining portion thereof emitted to the surface of a wall is displayed as a horizontal line. In this manner, based on the position and shape of the first patterned light and the second patterned light, the obstacle information obtainer 220 may determine the location, shape, and size (height) of the obstacle.

Figure 12:
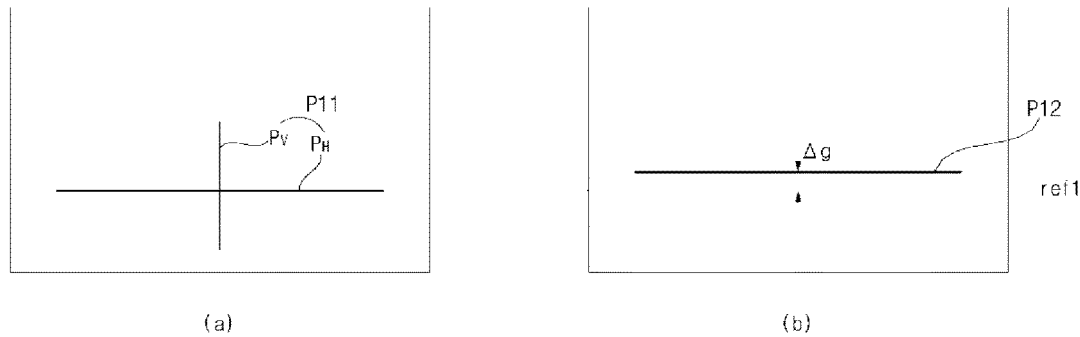
FIG. 12 is a diagram illustrating patterned light illustrated in FIG. 1B.

FIG. 12 is a diagram illustrating patterned light illustrated in FIG. 1B. In FIG. 12, portion (a) illustrates the first optical pattern P1 displayed on the acquired image, which is the case where the horizontal line Ph is detected at the reference position ref1. As illustrated in portion (b) of FIG. 12, in the case where the second optical pattern P2 is displayed, on the acquired image, above the reference position ref1 by a distance Δg, a vertical emission angle of the second pattern emission unit 130 is smaller than a predetermined value θr, such that it is desired to adjust the vertical emission angle of the second pattern emission unit 130.

However, if the distance Δg is in a predetermined error range, the distance Δg may be stored in a data storage, and then may be used later to obtain a distance from the position of the second optical pattern P2, displayed on the acquired image, to an obstacle, in which the distance may be obtained more precisely by compensating for the position of the second optical pattern P2 using the distance Δg.

Figure 13:
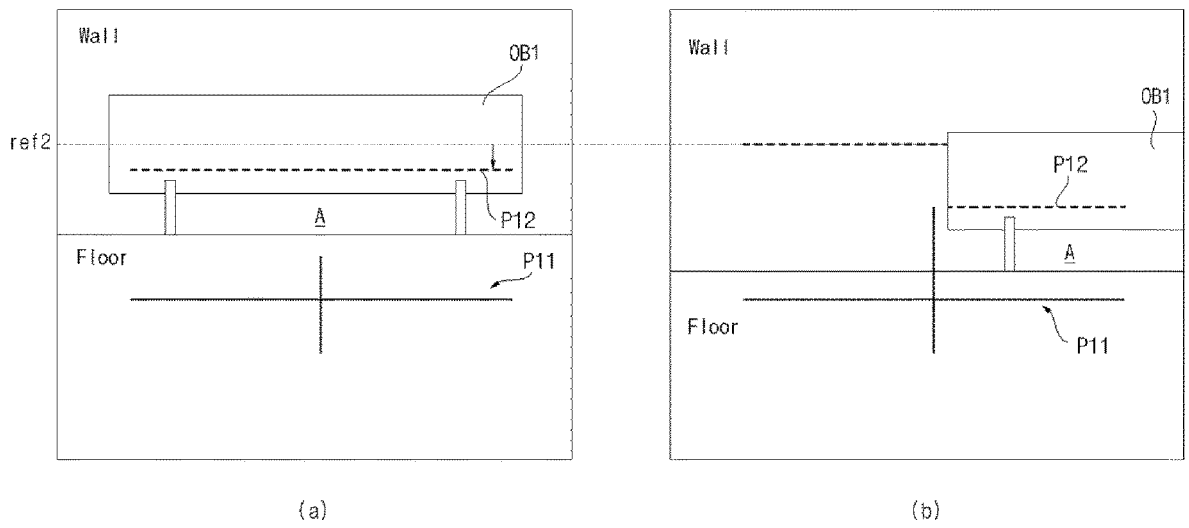
FIG. 13 is a diagram illustrating an image acquired according to a change in position of the mobile robot illustrated in FIG. 1B.

FIG. 13 is a diagram illustrating an image acquired according to a change in position of the mobile robot illustrated in FIG. 1B. In FIG. 13, (a) illustrates an image acquired in the case where the mobile robot is at position 1, and obstacle 1 is in front of the mobile robot; and (b) illustrates an image acquired in the case where the position of the mobile robot is changed to position 2. In the case where there is an obstacle OB1, such as a bed, in an area to be cleaned, with a space A being formed between the obstacle OB1 and the floor, the space A may be recognized, and the height of the space A may be desirably identified, such that it may be determined whether to pass through or bypass the obstacle OB1.

For example, as illustrated in portion (a) of FIG. 13, in the case where the alternative first patterned light P11 is incident on the floor in the space A, and the alternative second patterned light P12 is incident on a structure (for example, frame supporting a bed mattress) positioned on the space A, the obstacle information obtainer 220 included in the controller 200 may recognize that there is an obstacle above a portion where the alternative first patterned light P11 is incident, and particularly, may determine the distance from the mobile robot 1 to the obstacle OB1 based on the position of the alternative second optical pattern P12 displayed on the acquired image. Further, the vertical emission angle of the second pattern emission unit 130 is constant, such that based on the distance from the mobile robot 1 to the obstacle OB1, the obstacle information obtainer 220 may determine a height from the floor of an area to be cleaned to a portion where the second patterned light P2 is incident. Accordingly, based on these types of information, the obstacle information obtainer 220 may determine the height of the space A. In response to determination that the height of the space A is less than the height of the main body 10, the travel control unit 230 may control the travel driving unit 300 so that the main body 10 may bypass the obstacle OB1; by contrast, in response to determination that the height of the space A is greater than the height of the main body 10, the travel control unit 230 may control the travel driving unit 300 so that the main body 10 may enter or pass through the space A.

As illustrated in portion (b) of FIG. 13, in the case where the vertical line Pv of the alternative first patterned light extends to the wall, the horizontal line Ph is incident on the floor, and the alternative second patterned light P12 is partially incident on the obstacle OB1, such that a portion of the second patterned light P2 is incident on the obstacle OB1, with other portion thereof being incident on the wall, the obstacle information is obtained based on only the alternative first optical pattern P11 displayed on the acquired image if there is no second pattern emission unit 130. In this case, only the fact that there is a wall in front of the mobile robot may be identified. However, as illustrated in the exemplary embodiment, the second pattern emission unit 130 is provided, thereby further identifying that there is the obstacle OB1 between the mobile robot 1 and the wall. Particularly, based on the alternative second patterned light P12 including the horizontal line Ph, the obstacle OB1 may be detected over a wider region in a horizontal direction, thereby enabling detection of the obstacle OB1 positioned in a region which is not within reach of the vertical line Pv of the alternative first patterned light P11.

Figure 14:
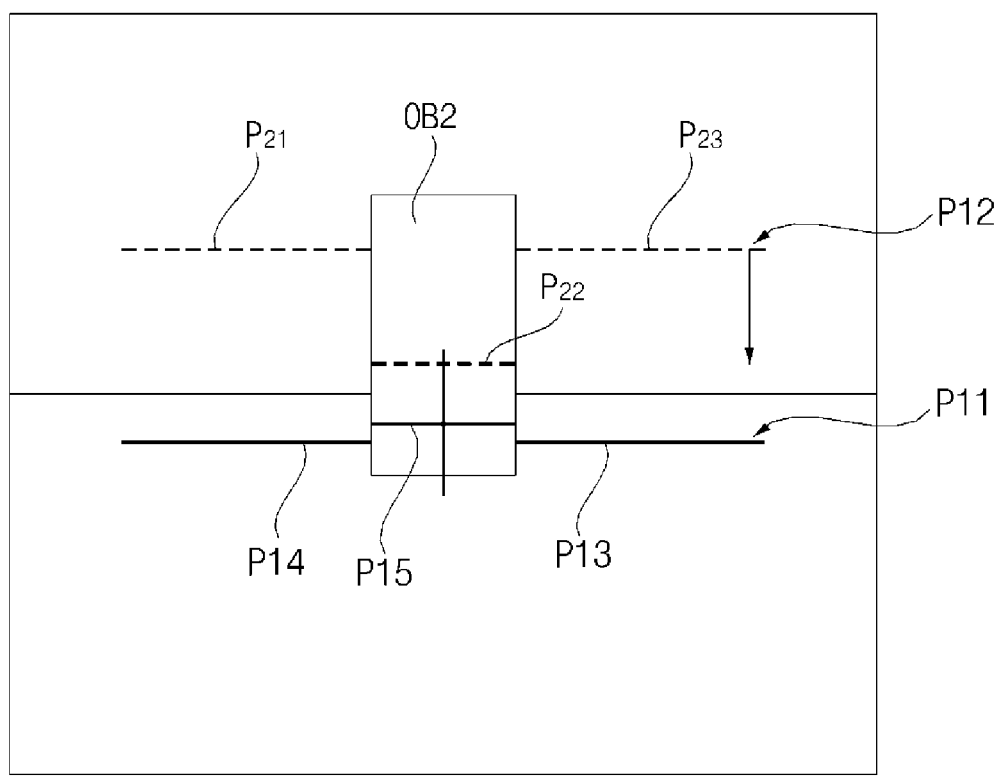
FIG. 14 is a diagram illustrating an acquired image of patterned light emitted onto an obstacle of the mobile robot illustrated in FIG. 1B.

FIG. 14 is a diagram illustrating an acquired image of patterned light emitted onto an obstacle of the mobile robot illustrated in FIG. 1B. Referring to FIG. 14, the mobile robot 1 according to an exemplary embodiment may specifically identify a stereoscopic shape of an obstacle based on the alternative second patterned light P12, in addition to the obstacle information identified based on the alternative first patterned light P11. For example, an actual height of an obstacle OB2 is too high for the mobile robot 1 to pass over while traveling, but at the current position of the mobile robot 1, the alternative first optical pattern P11 is incident on a lower portion of the obstacle. In this case, if there is no second pattern emission unit 13, the travel control unit 230 determines that the main body 10 may pass over the obstacle OB2, and first controls the main body 10 to travel toward the obstacle OB2; and as the main body 10 moves closer to the obstacle OB2, the position of the alternative second optical pattern P12 is gradually increased on the acquired image, such that upon determining that the height of the obstacle OB2 is at a higher level than a height at which the main body 10 may pass over, the travel control unit 230 controls the travel driving unit 300 so that the main body 10 may bypass the obstacle OB2.

By contrast, as in the exemplary embodiment, the second pattern emission unit 130 is provided, and the alternative second patterned light P12 is incident on the obstacle OB2 at the current position of the mobile robot 1, such that the height of the obstacle OB2 may be identified in advance, and a traveling path may be further optimized as well. The obstacle information obtainer 220 may recognize a cliff, positioned in front of the mobile robot 1, based on the length of the vertical line Pv displayed on the acquired image. In the case where there is a cliff (for example, stairs) in front of the mobile robot 1, a front end of the horizontal line may extend to a portion below the cliff, and a portion emitted to the portion below the cliff is not displayed on the acquired image, such that the length of the vertical line Pv, displayed on the acquired image, is decreased. Accordingly, in the case where the length of the vertical line Pv is decreased, the obstacle information obtainer 220 may determine that the there is a cliff in front of the mobile robot 1, and based on the determination, the travel control unit 230 may control the travel driving unit 300 so that the mobile robot 1 may travel along a path that does not lead to the cliff. Further, in the case where a portion of the horizontal line Ph (P13 to P15) is not displayed on the acquired image, the obstacle information obtainer 220 may determine that there is a cliff on the left side or the right side of the main body.

FIG. 15 is a diagram referred to in the description of a tilt of a main body of a mobile robot according to an exemplary embodiment of the present disclosure. As illustrated in portions (a) and (b) of FIG. 15, the main body 10 of the mobile robot 1 may be inclined to the left or to the right due to an obstacle, such as a threshold, a fan, and the like, which has a size equal to or less than a predetermined size. That is, in the case where the left wheel or the right wheel is lifted up due to a threshold or a fan, any one side of the main body 10 is also lifted up to the height of an obstacle, and thus the main body 10 is inclined.

Further, as illustrated in portions (c) and (d) of FIG. 15, the front side or the rear side of the main body 10 may be lifted up, and thus the main body 10 may be inclined. For example, while crossing the threshold, the main body 10 may be inclined in such a manner that the front side of the main body 10 is lifted up when moving up the threshold as illustrated in portion (c) of FIG. 15, and the rear side of the main body 10 is lifted up when moving down the threshold as illustrated in portion (d) of FIG. 15.

The sensor unit 150 detects information about a tilt direction, a tilt angle, and a first tilt θ1 to a fourth tilt θ4, and inputs the detected information to the controller 200. The controller 200 determines a tilt of the main body 10 based on a sensing signal input from the sensor unit 150, and based on the tilt direction and the tilt angle, the controller 200 performs tilt compensation relative to the optical pattern of the acquired image.

Figure 16:
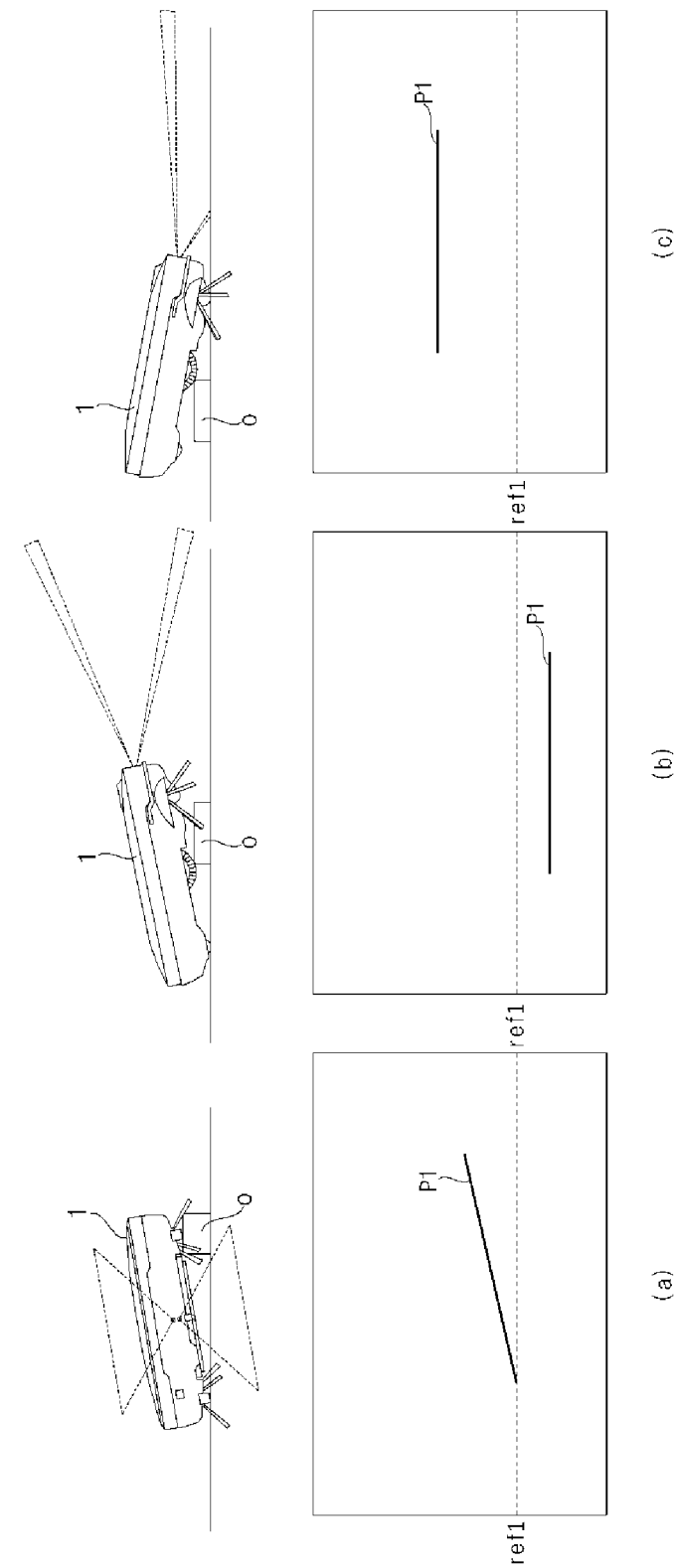
FIG. 16 is a diagram illustrating a pattern according to the tilt of the mobile robot illustrated in FIG. 15.

FIG. 16 is a diagram illustrating a pattern according to the tilt of the mobile robot illustrated in FIG. 15. As illustrated in portion (a) of FIG. 16, in the case where the main body 10 is inclined to the left or to the right due to an obstacle 0, an optical pattern P1 displayed on the acquired image is also inclined at a predetermined angle. The controller 200 determines the optical pattern P1 based on the sensing signal input from the sensor unit 150, and performs tilt compensation relative to the optical pattern P1 based on the tilt direction and the tilt angle of the main body 10.

In the case where the main body 10 is inclined with the left wheel thereof being lifted up over the obstacle 0, the obstacle information obtainer 220 determines that the optical pattern results from the tilt of the main body 10. The obstacle information obtainer 220 compensates for the optical pattern based on the tilt direction and angle, re-determines the obstacle located in front of the main body 10, and inputs information on the obstacle to the travel control unit 230. Based on the input information, the travel control unit 230 determines whether to pass through or bypass the obstacle while traveling, and controls traveling accordingly. As illustrated in portion (b) of FIG. 16, in the case where the mobile robot 1 crosses over the obstacle 0, for example, when moving up a threshold, the optical pattern P1 is displayed at a lower position than the reference position ref1. In some cases, when the threshold is high, the optical pattern may not be displayed on the acquired image.

In the case where the optical pattern is displayed at a lower position than the reference position ref1 or is not displayed thereon, the obstacle information obtainer 220 may determine that the obstacle is a cliff. However, in response to determination, based on the sensing signal input from the sensor unit 150, that the main body 10 is inclined, the obstacle information obtainer 220 re-determines that the obstacle is not a cliff. In this case, the obstacle information obtainer 220 may control traveling by performing tilt compensation relative to the optical pattern based on the tilt direction and angle. Further, before entering the threshold, which is an obstacle, the controller 200 determines the size and height of the obstacle, such that based on the determined information, the controller 200 may determine that the obstacle is not a cliff.

As illustrated in portion (c) of FIG. 16, in the case where the main body 10 moves down the obstacle 0, the mobile robot 1 is inclined to the front, such that the optical pattern P1 is displayed at a higher position than the reference position ref1. Based on the position of the optical pattern, the obstacle information obtainer 220 may determine that there is an obstacle in front of the mobile robot 1. In this case, in response to determination, based on the sensing signal input from the sensor unit 150, that the main body 10 is inclined to the front, the obstacle information obtainer 220 compensates for the optical pattern based on the tilt angle, and re-determines the presence of an obstacle. As a reaching range of patterned light varies depending on the degree of tilt, the controller 200 compensates for the optical pattern according to the tilt angle when the main body 10 is inclined, and then re-determines the presence of an obstacle. The travel control unit 230 controls traveling based on the presence of an obstacle.

While crossing over an obstacle, in the case where a tilt angle of the main body 10 is greater than a predetermined angle, the obstacle information obtainer 220, considering the case exceptional, ignores the optical pattern and determines that there is no obstacle. In response to the determination, the travel control unit 230 controls the main body 10 to continue traveling as there is no obstacle. For example, when the main body 10 enters a threshold, if the tilt angle of the main body 10 is greater than the predetermined angle, the main body 10 may move backward to bypass the threshold; however, after the main body 10 has already stood on the threshold, the main body 10 should cross the threshold, such that the obstacle information obtainer 220 ignores determination on an obstacle which is made based on the optical pattern, and determines that there is no obstacle. Based on the determination, the travel control unit 230 controls the travel driving unit 300 to continue traveling.

Figure 17:
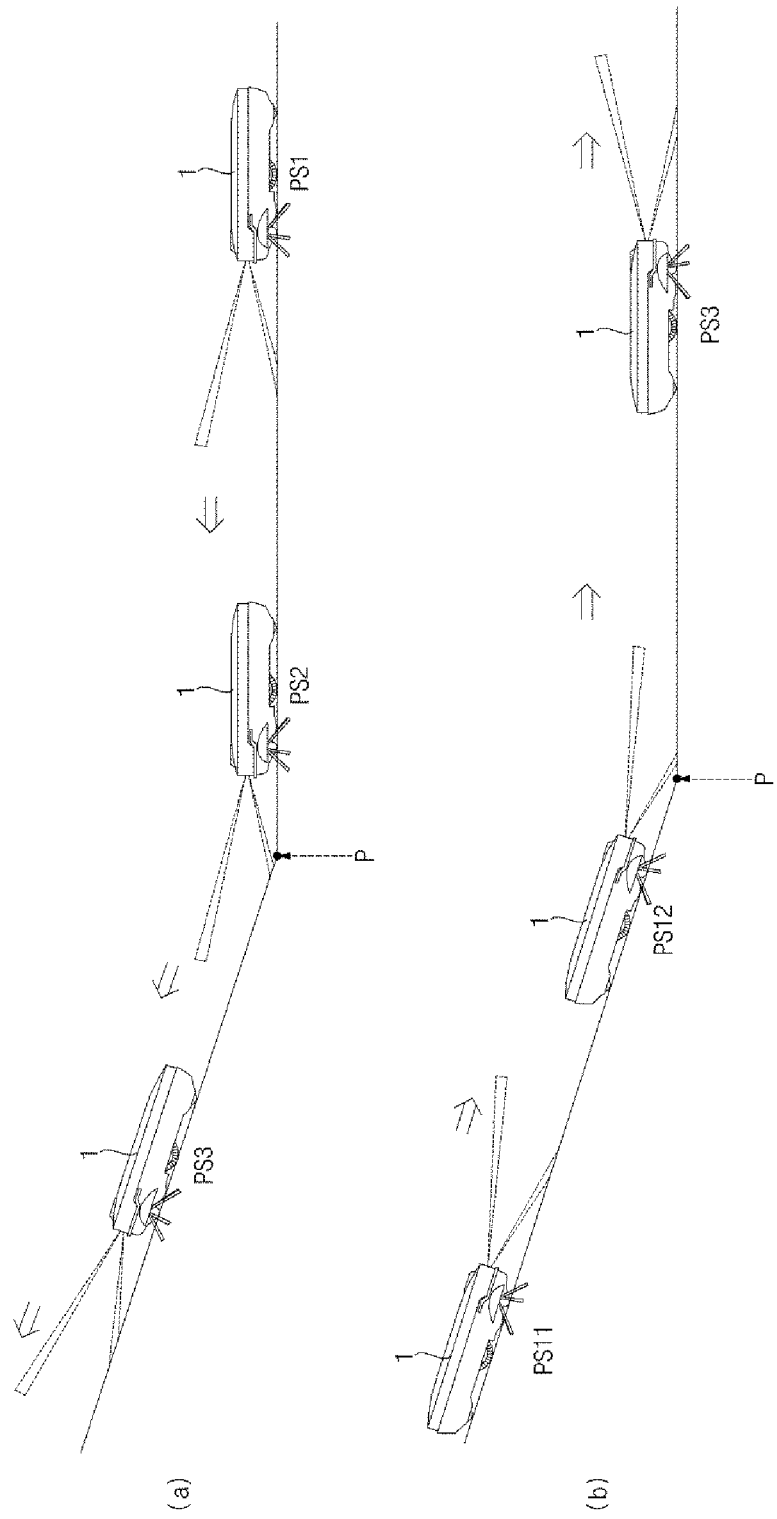
FIG. 17 is a diagram illustrating an example of entering a slope by a mobile robot according to an exemplary embodiment of the present disclosure.

As illustrated in FIG. 17, the mobile robot 1 may enter and travel on the slope. In this case, before entering the slope, the mobile robot 1 may determine that the slope is an obstacle based on the inclination angle of the slope, by analyzing the optical pattern of the acquired image. The obstacle information obtainer 220 analyzes the optical pattern of the acquired image to determine the inclination angle, and determines whether to enter the slope.

In the case where the inclination angle is equal to or greater than a predetermined angle, the obstacle information obtainer 220 determines that the slope is an obstacle; and in response to the determination, the travel control unit 230 determines not to enter the slope and controls the mobile robot 1 to bypass the obstacle. By contrast, in the case where the inclination angle is less than the predetermined angle, the obstacle information obtainer 220 determines that the slope is not an obstacle; and the travel control unit 230 determines to enter the slope, and controls the mobile robot 1 to continue traveling. The travel control unit 230 may determine whether the mobile robot 1 may enter not only an uphill slope but also a downhill slope. Hereinafter, description will be made on the case of a slope that is determined to enter, in which an inclination angle of the slope that may be determined to enter varies depending on the types of mobile robots. Further, it should be noted that in order to assist understanding of an optical pattern change according to the change in an inclination angle, the inclination angle is illustrated in the drawings with a size equal to or greater than a predetermined size.

As illustrated in portion (a) of FIG. 17, while traveling on a flat surface PS1, the mobile robot 1 may enter an uphill slope PS3 after passing a boundary point P. Before the mobile robot 1 enters the uphill slope in a section PS2, an inclination angle is formed at the boundary point P between the flat surface and the uphill slope. Accordingly, the slope may be determined to be an obstacle, although there is no obstacle in front of the mobile robot 1, and the patterned light is incident on the floor.

When the mobile robot 1 travels on the flat surface, the first optical pattern P1 is displayed at the reference position ref1 as illustrated in portion (a) of FIG. 18. As the mobile robot 1 approaches the uphill slope, the first optical pattern P1 is positioned higher than the reference position ref1 at the boundary point P which is a reference point, as illustrated in portion (b) of FIG. 18.

The obstacle information obtainer 220 determines the slope based on the change in position of the first optical pattern P1 while approaching the boundary point P. Even when moving an identical distance, the position of the first optical pattern P1 displayed in the case of an obstacle is different from the position of the first optical pattern P1 displayed in the case of a slope. Accordingly, based on such difference, the obstacle information obtainer 220 determines an inclination angle of the slope. Further, according to the inclination angle of the slope, the optical pattern is positioned higher than the reference position ref1 by a distance dt1, such that the obstacle information obtainer 220 performs compensation, and re-determines the obstacle.

Upon determining that it is possible to pass through the obstacle based on determination on the inclination angle or the obstacle, the travel control unit 230 controls the travel driving unit 300 to enter the slope. As the mobile robot 1 passes the boundary point P to enter the slope, the mobile robot 1 is inclined, but the first optical pattern P1 is displayed at the reference position ref1 while the mobile robot 1 travels on the slope, as illustrated in portion (c) of FIG. 18, which indicates a normal state. Based on the sensing signal input from the sensor unit 150, the obstacle information obtainer 220 determines that the main body 10 is inclined, and determines whether to perform tilt compensation when an obstacle is detected.

Further, as illustrated in portion (b) of FIG. 17, the mobile robot 1 may move down a downhill slope PS11 to enter the flat surface PS13. In this case, the optical pattern displayed on the acquired image is the same as the optical pattern displayed when the mobile robot 1 moves up the uphill slope as illustrated in portions (a) to (c) of FIG. 18.

Before the mobile robot 1 reaches the boundary point P in the section PS12, the inclination angle is changed at the boundary point P, such that the slope may be determined to be an obstacle, although there is no obstacle in front of the mobile robot 1, and the patterned light is incident on the floor. Based on the acquired image input by the obstacle detection unit 100, as the first optical pattern P1 is displayed above the reference position ref1 as illustrated in portion (b) of FIG. 18, the controller 200 determines an obstacle. Based on the sensing signal input from the sensor unit 150, the obstacle information obtainer 220 determines that the main body 10 is inclined, and accordingly, performs tilt compensation relative to the optical pattern.

In the case where, according to the tilt angle of the main body 10, the optical pattern is positioned higher than the reference position ref1 by the distance dt1, the obstacle information obtainer 220 performs compensation and re-determines an obstacle. As the inclination angle is changed at the boundary point P, an obstacle may be determined to be present although there is no obstacle. In this case, the obstacle information obtainer 220 performs tilt compensation to re-determine that there is no obstacle. Then, the travel control unit 230 controls the travel driving unit 300 so that the main body 10 continues traveling.

When the main body 10 passes the boundary point 10 to enter a flat surface, the obstacle information obtainer 220 determines that the main body 10 has entered the flat surface based on the sensing signal input from the sensor unit 150, and does not perform tilt compensation with respect to an obstacle detected thereafter. In this case, the first optical pattern is displayed normally on the acquired image.

While the main body 10 is inclined, even when the tilt angle of the main body 10 is greater than a predetermined angle, or an obstacle is determined to be present even after compensation is performed, the controller 200 may ignore the detection of an obstacle based on the optical pattern and may control to continue traveling. That is, the obstacle information obtainer 220 ignores determination on an obstacle that is made based on the first optical pattern, so that the main body 10 may return to a normal state from an inclination state. As described above with reference to (a) of FIG. 17, if an inclination angle is greater than a predetermined angle, the mobile robot 1 determines that there is an obstacle, and does not enter, but when the main body 10 has already stood on the slope and is inclined, the main body 10 travels to escape from the inclination state.

Figure 19:
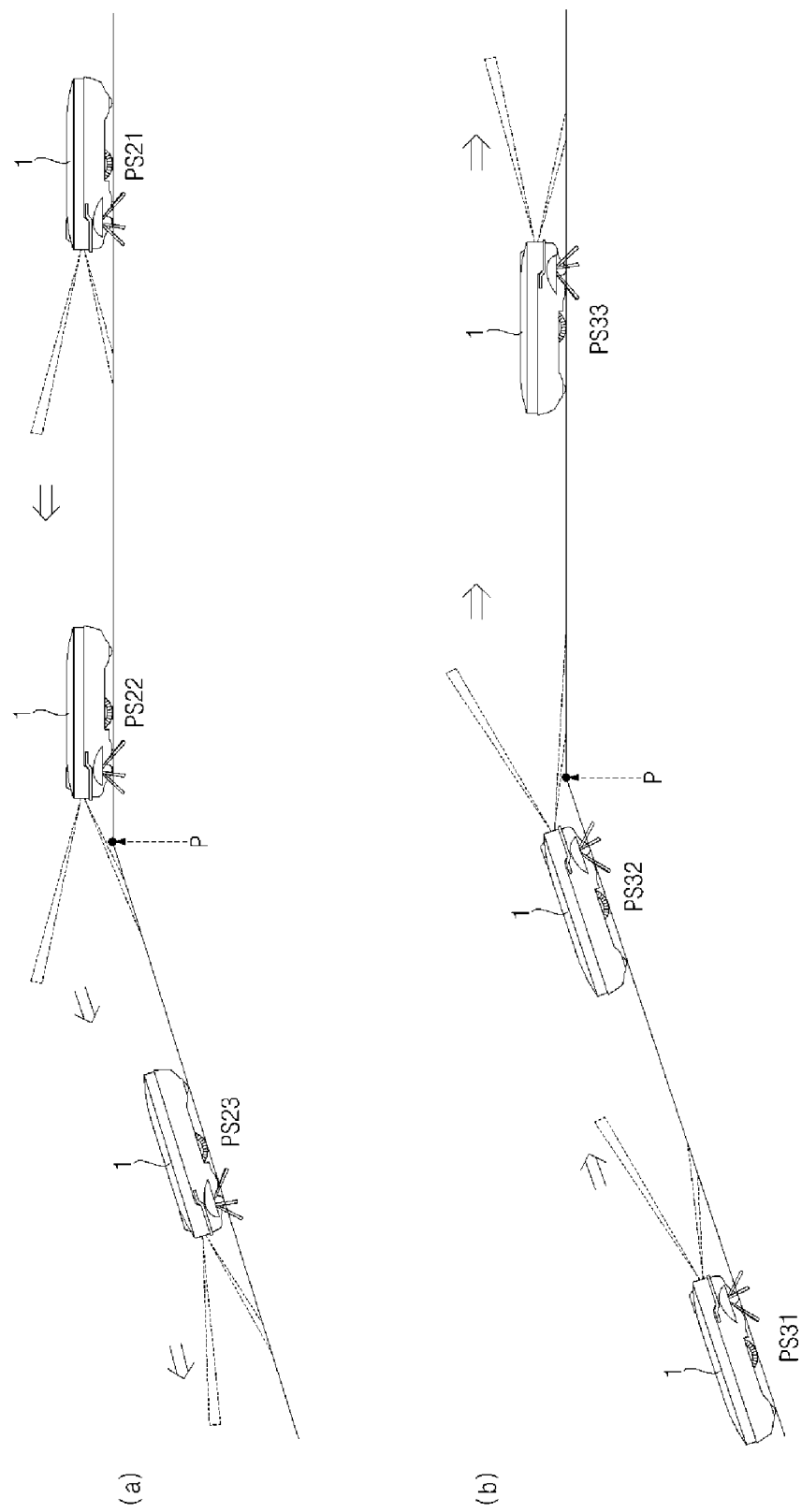
FIG. 19 is a diagram illustrating another example of entering a slope by a mobile robot according to an exemplary embodiment of the present disclosure.

As illustrated in FIG. 19, while traveling on a flat surface PS21, the mobile robot 1 may pass the boundary point P to enter a downhill slope PS23. Before the mobile robot 1 enters the downhill slope in a section PS22, an inclination angle is formed at the boundary point P between the flat surface and the slope, such that the slope may be determined to be an obstacle, i.e., a cliff, although there is no obstacle in front of the mobile robot 1, and the patterned light is incident on the floor. In this case, as illustrated in portion (a) of FIG. 20, the first optical pattern P1 is displayed at the reference position ref1 on the acquired image for the flat surface PS22, such that the obstacle information obtainer 220 determines that the first optical pattern P1 is in a normal state.

Further, on the acquired image before entering the downhill slope in the section PS22, the first optical pattern P1 is positioned lower than the reference position ref1 by a distance dt2, as illustrated in portion (b) of FIG. 20; or the first optical pattern P1 is not displayed on the acquired image. Based on the optical pattern displayed on the acquired image, the obstacle information obtainer 220 first determines that the downhill slope is a cliff. Then, based on a position change of the first optical pattern P1 while approaching the slope, the obstacle information obtainer 220 may determine the downhill slope. In addition, by using a cliff sensor that is provided separately, the obstacle information obtainer 220 may further determine whether an obstacle is a cliff.

In the case where an inclination angle of the downhill slope is equal to or greater than a predetermined angle, the travel control unit 230 determines that an obstacle is a cliff, and controls to bypass the cliff. By contrast, in the case where an inclination angle of the downhill slope is less than the predetermined angle, the travel control unit 230 determines that it is possible to pass through, and controls to continue traveling. In the case where the inclination angle is less than the predetermined angle, the obstacle information obtainer 220 compensates for the position of the optical angle by dt2 according to the inclination angle, and re-determines an obstacle. By compensating for a position change according to the inclination angle, the controller 200 determines that it is possible to pass through and inputs a travel command to the travel driving unit 300.

After the mobile robot 1 has entered the downhill slope PS23, the sensor unit 150 senses the tilt of the main body 10 and inputs the sensed tilt to the controller 200. As the first optical pattern P1 is displayed at the reference position ref1 on the acquired image as illustrated in portion (c) of FIG. 20, the obstacle information obtainer 220 determines that the first optical pattern P1 is in a normal state.

As illustrated in portion (b) of FIG. 19, the mobile robot 1 may move down the downhill slope PS31 to enter the flat surface PS33. In this case, the change in the optical pattern displayed on the acquired image is shown in portions (a) to (c) of FIG. 20. As the mobile robot 1 approaches the boundary point P in the section PS32, the inclination angle is changed, such that the first optical pattern P1 displayed on the acquired image is positioned lower than the reference position ref1 by the distance dt2, as illustrated in portion (b) of FIG. 20.

Based on the sensing signal input from the sensor unit 150, the obstacle information obtainer 220 determines that the main body 10 is inclined, and performs tilt compensation relative to the optical pattern according to the tilt angle of the main body 10. Then, based on the tilt compensation relative to the optical pattern, the obstacle information obtainer 220 re-determines an obstacle, and based on information on the re-determined obstacle, the travel control unit 230 determines whether it is possible to pass through.

As the mobile robot 1 has entered the flat surface, the optical pattern is displayed normally on the acquired image as illustrated in portion (c) of FIG. 20. Based on the sensing signal input from the sensor unit 150, the obstacle information obtainer 220 determines that the mobile robot 1 has entered the flat surface, and controls not to perform tilt compensation.

Figure 21:
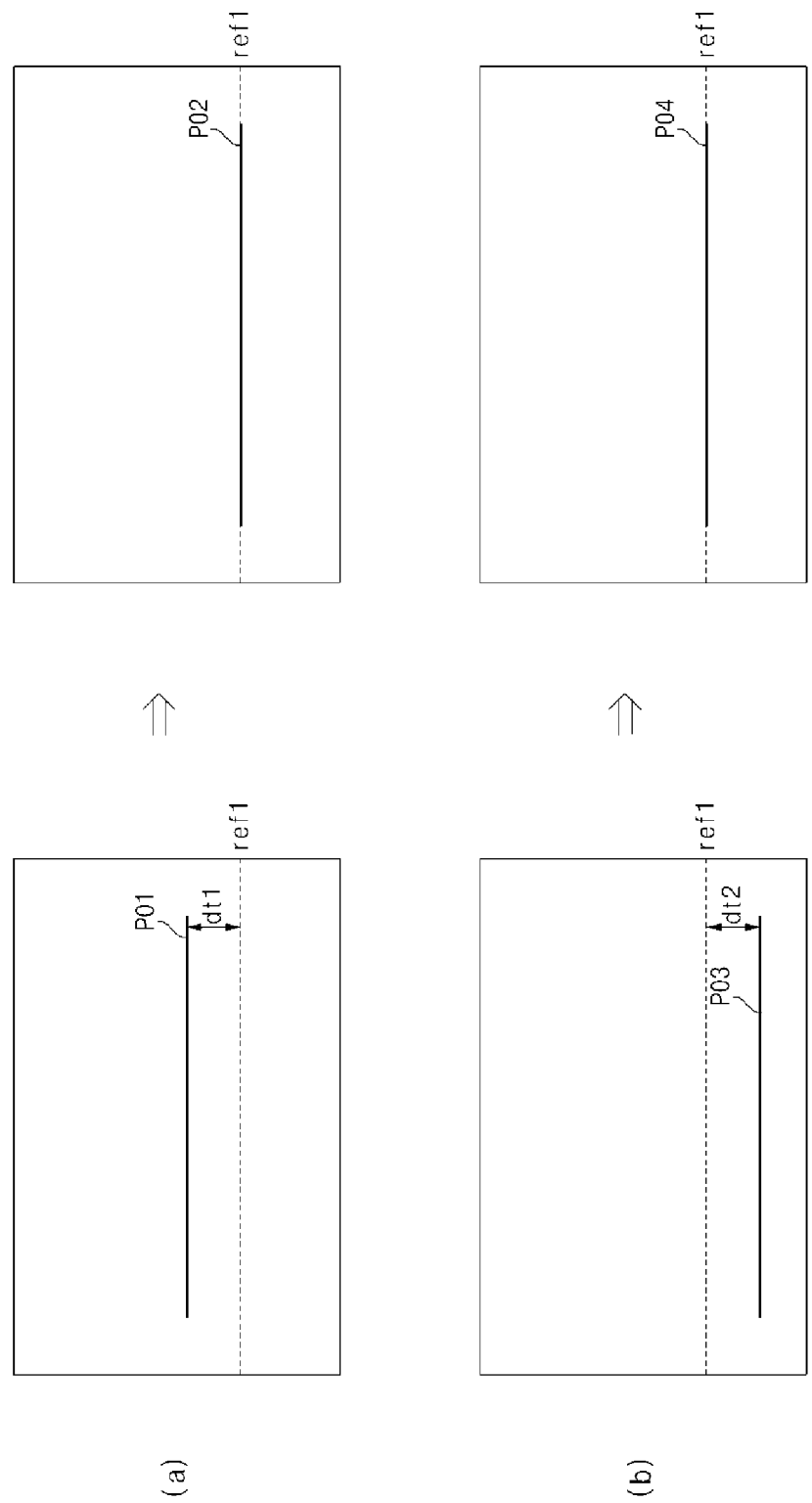
FIG. 21 is a diagram illustrating an example of correcting a tilt of a mobile robot according to an exemplary embodiment of the present disclosure.

FIG. 21 is a diagram illustrating an example of correcting a tilt of a mobile robot according to an exemplary embodiment of the present disclosure. As illustrated in FIG. 21, based on the sensing signal input from the sensor unit 150, the controller 200 compensates for the tilt of the mobile robot 1 relative to the optical pattern displayed on the acquired image.

As illustrated in portion (a) of FIG. 21, in the case where the main body 10 is inclined to the front, the first optical pattern P1 displayed on the acquired image is positioned higher than the reference position ref1 by a distance dt1 according to a tilt angle. The obstacle information obtainer 220 may perform tilt compensation according to the tilt angle, by changing the position of the first optical pattern P1 by the distance dt1. In response to the tilt compensation, the obstacle information obtainer 220 determines that the first optical pattern P1 is in a normal state, and the travel control unit 230 controls the travel driving unit 300 to continue traveling.

In the case where the main body 10 is inclined to the rear, the first optical pattern P1 is positioned lower than the reference position ref1 by a distance dt2 according to a tilt angle, as illustrated in portion (b) of FIG. 21. Based on the sensing signal input from the sensor unit 150, the obstacle information obtainer 220 compensates for the position of the first optical pattern by the distance dt2 according to the tilt angle. By performing the tilt compensation, the first optical pattern P1 may be displayed at the reference position ref1 on the acquired image, such that the obstacle information obtainer 220 determines that the first optical pattern is in a normal state.

Figure 22:
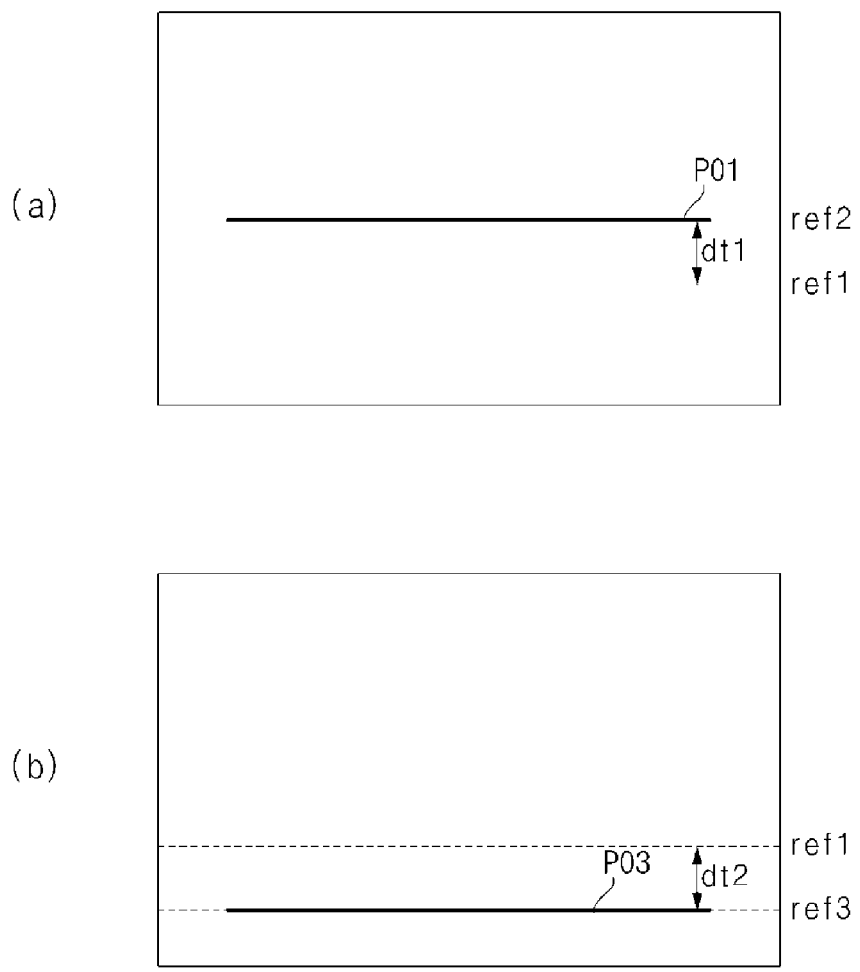
FIG. 22 is a diagram illustrating another example of correcting a tilt of a mobile robot according to an exemplary embodiment of the present disclosure.

FIG. 22 is a diagram illustrating another example of correcting a tilt of a mobile robot according to an exemplary embodiment of the present disclosure. As illustrated in FIG. 22, the controller 200 may compensate for the tilt by changing the reference position according to the tilt.

As illustrated in portions (a) and (b) of FIG. 22, corresponding to a tilt angle input from the sensor unit 150, the obstacle information obtainer 220 may compensate for a tilt by setting a second reference position ref2 or a third reference position ref3, and may determine an obstacle. In the case where the main body 10 is inclined to the front, the first optical pattern P1 displayed on the acquired image is positioned higher than the reference position ref1 by a distance dt1 according to a tilt angle. Corresponding to the tilt angle, the obstacle information obtainer 220 determines the first optical pattern P1 not based on the reference position ref1 but based on the second reference position ref2, so as to determine an obstacle located in front of the main body 10.

By contrast, in the case where the main body 10 is inclined to the rear, the first optical pattern 220 is positioned lower than the reference position by a distance dt2. Corresponding to the tilt angle, the obstacle information obtainer 220 determines the first optical pattern P1 based on the third reference position ref3, so as to determine an obstacle located in front of the main body 10. By comparing the position of the first optical pattern with the second reference position or the third reference position, the obstacle information obtainer 220 determines that the first optical pattern P1 is in a normal state. Accordingly, by changing the tilt, the mobile robot 1 does not recognize the floor as an obstacle and may continue traveling.

The obstacle information obtainer 220 may compensate for the first optical pattern P1 according to a tilt angle. If the first optical pattern P1 is not in a normal state even after performing the compensation by changing a reference position, the obstacle information obtainer 220 determines that there is an obstacle, and the travel control unit 230 controls the travel driving unit 300 to bypass the obstacle.

Figure 23:
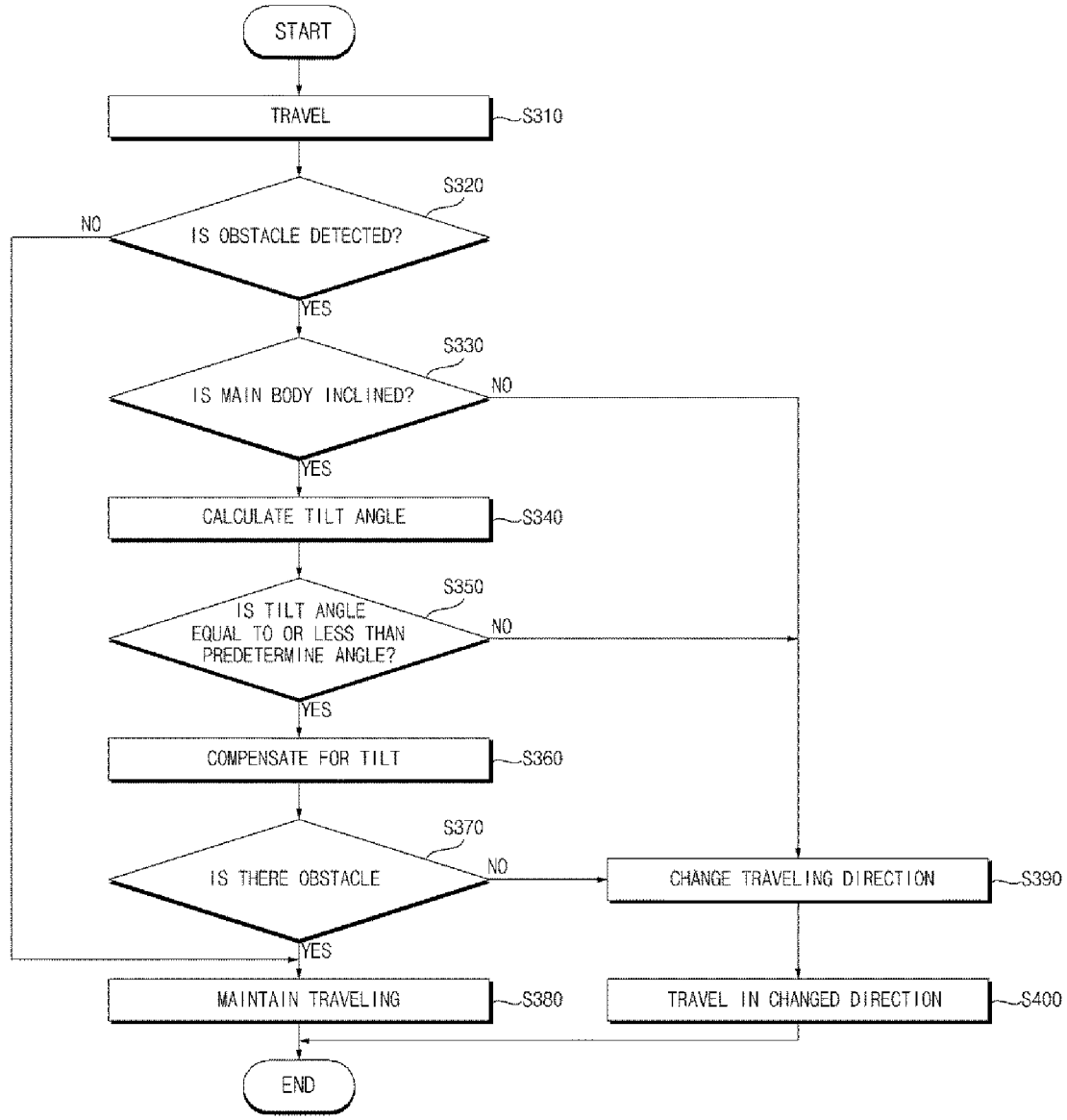
FIG. 23 is a flowchart illustrating a controlling method of compensating for a tilt of a mobile robot according to an exemplary embodiment of the present disclosure.

FIG. 23 is a flowchart illustrating a controlling method of compensating for a tilt of a mobile robot according to an exemplary embodiment of the present disclosure.

As illustrated in FIG. 23, while traveling in S310, the mobile robot 1 extracts a pattern from an acquired image input by the obstacle detection unit 100 to detect an obstacle. The pattern detection unit 210 extracts a pattern from the acquired image; and the obstacle information obtainer 220 compares a position of the extracted pattern, i.e., the optical pattern, with the reference position, to determine an obstacle based on whether the position of the optical pattern is displayed at the reference position in S320.

In the case where the optical pattern is positioned higher than the reference position, the obstacle information obtainer 220 of the controller 200 determines that there is an obstacle in a traveling direction, while in the case where the optical pattern is positioned lower than the reference position, the obstacle information obtainer 220 determines that there is a cliff.

Further, based on the sensing signal input from the sensor unit 150, the controller 200 determines whether the main body 10 is inclined in S330. For example, in the case where the main body 10 is inclined in any one direction of the front, rear, left, or right, as illustrated above in FIGS. 15 and 16, an obstacle may be determined to be present although there is no obstacle, such that the controller 200 determines whether the main body 10 is inclined.

In the case where the main body 10 is inclined, the obstacle information obtainer 220 calculates a tilt angle of the main body 10 based on the sensing signal in S340, and determines whether the tilt angle is equal to or less than a predetermined angle in S350. In the case where the main body 10 is inclined at an angle equal to or less than the predetermined angle, the obstacle information obtainer 220 compensates for the tilt relative to the optical pattern of the acquired image in S360. The obstacle information obtainer 220 may compensate for the tilt by changing the position of the optical pattern or the reference position according to the tilt.

Upon compensating for the tilt, the obstacle information obtainer 220 compares the position of the optical pattern with the reference position, and re-determines the presence of an obstacle in S370. After the tilt compensation, in the case where the optical pattern is displayed at the reference position, the obstacle information obtainer 220 determines that the optical pattern is in a normal state, and accordingly, the travel control unit 230 maintains traveling in S380.

By contrast, after the tilt compensation, in the case where the optical pattern is positioned higher than the reference position, the obstacle information obtainer 220 determines that there is an obstacle in a traveling direction, while in the case where the optical pattern is positioned lower than the reference position, the obstacle information obtainer 220 determines that there is a cliff. In response to the determination, the travel control unit 230 changes the traveling direction to bypass the obstacle in S390. The travel control unit 230 controls the travel driving unit 300 to bypass the obstacle by traveling in the changed direction, and the mobile robot 1 travels in the changed direction S400.

In the case where the main body 10 is inclined to the front, and an obstacle is not a cliff, the obstacle information obtainer 220 ignores the determination on an obstacle which is made based on the optical pattern, and determines that there is no obstacle. The travel control unit 230 controls the travel driving unit 300 to continue traveling. In the case as illustrated in portion (c) of FIG. 16, the mobile robot 1 ignores an obstacle and continues traveling to escape from an inclination state.

Figure 24:
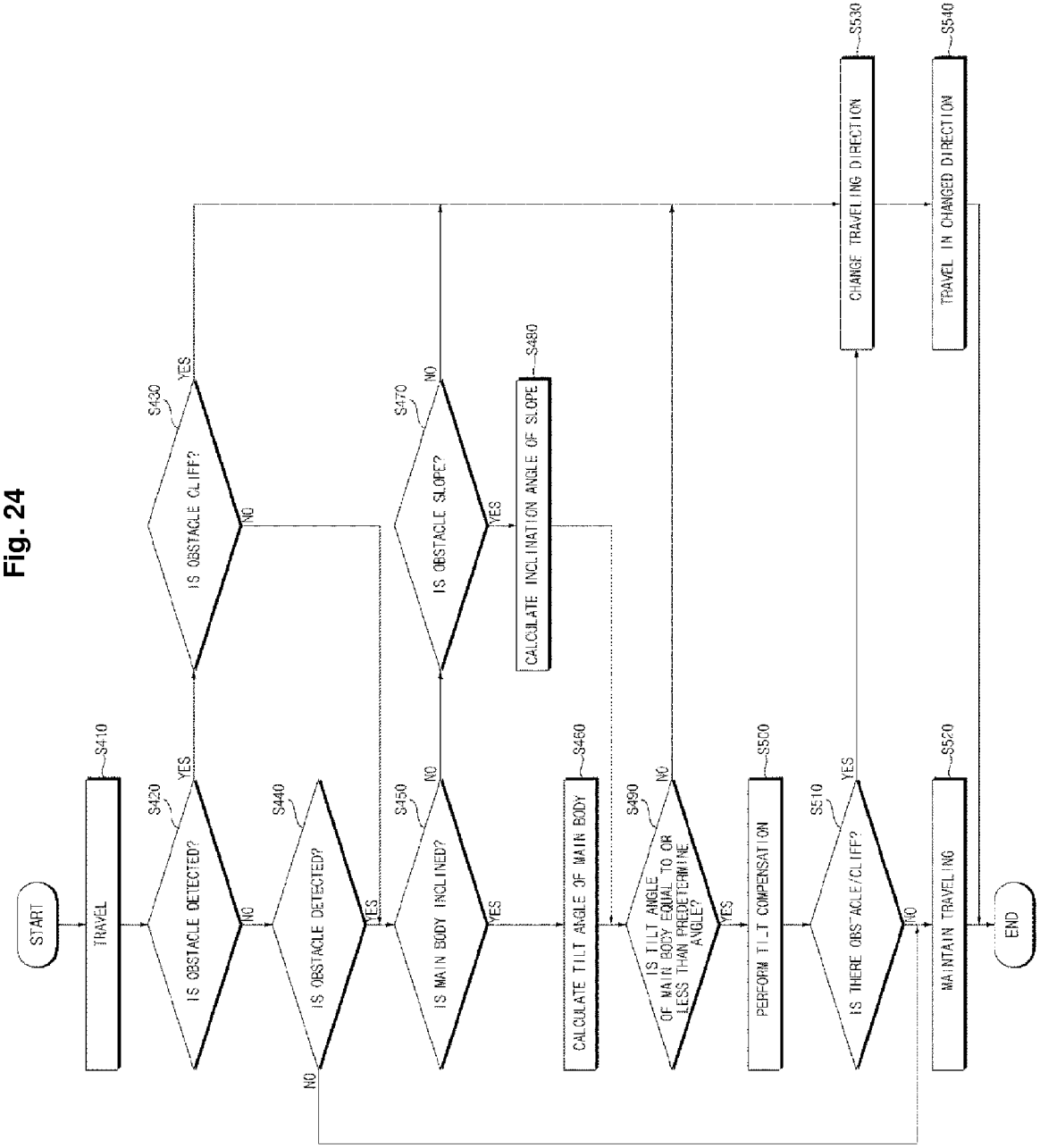
FIG. 24 is a flowchart illustrating a method of travelling by compensating for a tilt of a mobile robot according to an exemplary embodiment of the present disclosure.

FIG. 24 is a flowchart illustrating a method of travelling by compensating for a tilt of a mobile robot according to an exemplary embodiment of the present disclosure. As illustrated in FIG. 24, while the mobile robot 1 travels in a predetermined direction in S410, when the obstacle detection unit 100 detects an obstacle in S420, the obstacle information obtainer 220 determines the location and size of the obstacle based on the optical pattern of the acquire image as described above. In the case where the optical pattern is displayed at the reference position, which indicates a normal state, the obstacle information obtainer 220 determines that there is no obstacle in the traveling direction. In response to the determination, the travel control unit 230 maintains the set traveling in S520.

In the case where the detected obstacle is a cliff, the travel control unit 230 approaches the obstacle, i.e., the cliff, by moving a predetermined distance, and then re-determines the presence of the cliff by using a cliff sensor in S430. In the case where an obstacle is a cliff, the travel control unit 230 changes a traveling direction in S530 so as not to fall off the cliff, and controls the travel driving unit 300 to travel in the changed direction in S540.

In the case where an obstacle is not a cliff, the controller 200 determines based on the sensing signal input from the sensor unit 150 whether the main body 10 is inclined in S450. If the main body 10 is not inclined, the obstacle information obtainer 220 determines whether an obstacle located in front of the main body 10 is a slope in S470. As described above, in the case of an uphill slope, the optical pattern displayed on the acquired image is positioned higher than the reference position; and in the case of a downhill slope, the optical pattern displayed on the acquired image is positioned lower than the reference position. In this manner, an obstacle may be determined.

While moving forward a predetermined distance, the obstacle information obtainer 220 determines whether an obstacle is a slope by comparing a position change of the optical pattern in the case of a slope with a position change in the case of an obstacle. In the case of a slope, the obstacle information obtainer 220 calculates an inclination angle of the slope in S480 based on the position change of the optical pattern. If the obstacle is not a slope, the obstacle information obtainer 220 determines an obstacle. The travel control unit 230 changes a traveling direction to bypass the obstacle in S530, and controls the travel driving unit 300 to travel in the changed direction in S540.

If the main body 10 is inclined, the obstacle information obtainer 220 calculates a tilt angle of the main body 10 based on the sensing signal in S460, and determines whether the tilt angle of the main body 10 is equal to or less than a predetermined angle in S490. In addition, the obstacle information obtainer 220 determines whether the inclination angle of a forward slope is equal to or less than the predetermined angle.

In the case where the tilt angle of the main body 10 is greater than the predetermined angle, the obstacle information obtainer 220 determines that there is an obstacle. The travel control unit 230 changes a traveling direction so as not to enter the slope in S530, and controls the travel driving unit 300 to travel in the changed direction in S540. Further, in the case where the tilt angle is greater than the predetermined angle, the travel control unit 230 changes a traveling direction in S530, and controls the travel driving unit 300 to travel in the changed direction in S540. In this case, the travel control unit 230 may control the main body 10 to move backward to return to a normal state.

In a case where the main body 10 is inclined but an obstacle is not a cliff, the obstacle information obtainer 220 ignores determination on an obstacle that is made based on the optical pattern, and determines that there is no obstacle, although a tilt angle is greater than a predetermined angle. In response to the determination, the travel control unit 230 controls the main body 10 to continue traveling. For example, in the above-described case as illustrated in portion (c) of FIG. 16, the obstacle information obtainer 220 ignores an obstacle detected based on the optical pattern, and controls the mobile robot 1 to continue traveling, so that the mobile robot 1 may escape from an inclination state.

In the case where the tilt angle of the main body 10, or the inclination angle of a slope, is equal to or less than the predetermined angle, the obstacle information obtainer 220 may perform tilt compensation according to the tilt angle of the main body 10 or the inclination angle of the slope in S500. The obstacle information obtainer 220 may perform tilt compensation by changing the position of the optical pattern or the reference position by a predetermined value, according to the tilt angle of the main body 10 or the inclination angle of the slope.

After performing the tilt compensation, the obstacle information obtainer 220 compares the position of the optical pattern with the reference position to re-determine the presence of an obstacle in S510. After performing the tilt compensation, in the case where the optical pattern is displayed at the reference position, the obstacle information obtainer 220 determines that the optical pattern is in a normal state, and the travel control unit 230 controls the main body 10 to maintain traveling in S520.

Accordingly, in the case where as the main body 10 is inclined, the optical pattern is not in a normal state although there is no obstacle, the mobile robot 1 may travel by performing tilt compensation. Further, in the case where a slope is recognized as an obstacle, the mobile robot 1 may continue traveling to enter the slope if an inclination angle of the slope is equal to or less than a predetermined angle. In the case where the optical pattern is not displayed at the reference position even after the tilt compensation, the obstacle information obtainer 220 determines an obstacle or a cliff. Then, the travel control unit 230 changes a traveling direction in S530 to bypass the obstacle, and controls the travel driving unit 300 to travel in the change direction in S540.

With respect to determination on an obstacle by using the optical pattern, the mobile robot 1 determines a tilt angle of the main body 10 or determines whether the obstacle is a slope, so as to compensate for the tilt, thereby preventing a wrong determination on an obstacle when there is no obstacle in practice, and enabling the mobile robot 1 to continue traveling. In this manner, an area, which is mistakenly determined to be an obstacle and thus is not approached, may be reduced, and the mobile robot 1 may reach a wider area to be cleaned, thereby extending the area that may be cleaned.

The present disclosure to provide a mobile robot and a method of controlling the same, in which by sensing a tilt of the mobile robot and performing tilt compensation according to a degree of tilt, an obstacle is re-determined based on a result of the tilt compensation for traveling of the mobile robot.

In accordance with one aspect, there is provided a mobile robot, including: a main body configured to travel in an area to be cleaned and suck foreign materials on a floor of the area to be cleaned; a sensor unit configured to sense a tilt of the main body and input a sensing signal; a first pattern emission unit provided on a front surface of the main body and configured to emit a first patterned light downward and forward from the main body; a second pattern emission unit provided on the front surface of the main body and below the first pattern emission unit, and configured to emit a second patterned light upward and forward from the main body; an image acquisition unit provided on the front surface of the main body and configured to acquire a forward image of the main body; and a controller configured to determine an obstacle by detecting a first optical pattern, corresponding to the first patterned light, and a second optical pattern, corresponding to the second patterned light, from the image acquired from the image acquisition unit, and control the main body to pass through or bypass the obstacle, wherein the controller determines, based on the sensing signal input by the sensor unit, whether the main body is inclined, and in response to the main body being inclined, the controller performs tilt compensation relative to the first optical pattern according to the tilt of the main body, and re-determines the obstacle.

In accordance with another aspect, there is provided a method of controlling a mobile robot, the method including: traveling while emitting first patterned light and second patterned light and acquiring a forward image of the mobile robot; sensing an obstacle by detecting a first optical pattern, corresponding to the first patterned light, and a second optical pattern, corresponding to the second patterned light, from the acquired image; sensing a tilt of the main body; in response to the main body being inclined, performing tilt compensation relative to the first optical pattern or the second optical pattern according to the tilt of the main body;

and after the tilt compensation, re-determining the obstacle to control the main body to pass through or bypass the obstacle.

The present disclosure provides the mobile robot and the method of controlling the same, in which by using patterns which are vertically provided and emitted, by sensing a tilt of the main body, and by compensating for the tilt relative to the emitted patterns, obstacles may be determined accurately. Further, upon performing the tilt compensation, re-determination is made as to whether it is possible to pass through, so as to enable the mobile robot to pass through or bypass an obstacle. Accordingly, the mobile robot may reach a wider area to be cleaned, thereby extending the area that may be cleaned, and enabling fast determination and operation for more effective traveling, such that the mobile robot may escape from an obstacle without being limited thereby.

While the present disclosure has been described herein with reference to the accompanying drawings, this disclosure is only illustrative of preferred embodiments of the present disclosure and is not intended to limit the present disclosure. Further, it will be apparent to those skilled in the art that various modifications and variations may be made without departing from the spirit and scope of the disclosure.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot, comprising:
a main body configured to travel in an area to be cleaned and apply suction to a floor in the area;
a sensor configured to detect a tilt of the main body;
a first pattern light source provided on a front portion of the main body and configured to emit a first patterned light toward a first sub-area of a particular area;
an camera provided on the front portion of the main body and configured to capture an image of the particular area; and
a controller configured to:
detect a first optical pattern, corresponding to the first patterned light, in the image captured from the camera,
perform tilt compensation relative to the first optical pattern based on the tilt of the main body,
determine whether an obstacle is present in the particular area based on the tilt-compensation and first optical pattern, and
control a movement of the main body based on whether the obstacle is present,
wherein the controller is further configured to:
determine, based on the tilt of the main body, whether the obstacle includes a slope,
determine an inclination angle of the slope, and
when the inclination angle of the slope is equal to or less than a predetermined angle, control the main body to move up the slope.

2. The mobile robot of claim 1, further comprising:
a second pattern light source provided below the first pattern light source on the front portion of the main body and configured to emit a second patterned light toward a second sub-area of the particular area, the second sub-area being position above the first sub-area,
wherein the controller is further configured to:
detect second optical pattern, corresponding to the second patterned light, in the image captured from the camera, and
determine whether an obstacle is present in the particular area further based on the second optical pattern.

3. The mobile robot of claim 1, wherein the controller, when performing the tilt compensation, is further configured to:
adjust a position of the first optical pattern in the image based on the tilt of the main body.

4. The mobile robot of claim 3, wherein the controller, when adjusting the position of the first optical pattern in the image based on the tilt of the main body, is further configured to:
raise the first optical pattern in the image when the tilt of the main body indicates that the front portion of the main body is positioned higher than a rear portion of the main body, and
lower the first optical pattern in the image when the tilt of the main body indicates that the front portion of the main body is positioned lower than the rear portion of the main body.

5. The mobile robot of claim 3, wherein the controller, when adjusting the position of the first optical pattern in the image based on the tilt of the main body, is further configured to:
adjust a slope of the first optical pattern in the image based on the tilt of the main body when the tilt indicates that main body is inclined left or right.

6. The mobile robot of claim 1, wherein the controller, when determining whether the obstacle is present in the particular area, is further configured to compare a position of the first optical pattern in the image with a reference position, and determine that the obstacle is present in the particular area when the first optical pattern is positioned in the image above the reference position, and
wherein the controller, when compensating for the tilt, is further configured to:
change the reference position in the image according to the tilt of the main body.

7. The mobile robot of claim 6, wherein the controller, when determining whether the obstacle is present in the particular area, is further configured to:
determine that no obstacle is present in the particular area when the first optical pattern is positioned in the image are the adjusted reference position; and
determine that there an obstacle is present in the particular region when the first optical pattern is positioned in the image above the adjusted reference position.

8. The mobile robot of claim 6, wherein the controller, when changing the reference position in the image according to the tilt of the main body, is further configured to:
  lower the reference position when the tilt of the main body indicates that the front portion of the main body is positioned higher than a rear portion of the main body, and
  raise the reference position when the tilt of the main body indicates that the front portion of the main body is positioned lower than the rear portion of the main body.

9. The mobile robot of claim 1, wherein the controller, when determining whether the obstacle is present in the particular area based on the tilt-compensation and first optical pattern, is further configured to:
  when a tilt angle of the main body is equal to or less than a threshold angle, determine whether the obstacle is present in the particular area based on the tilt compensated first optical pattern; and
  when the tilt angle of the main body is greater than the threshold angle, determine that the obstacle is not present in the particular area.

10. The mobile robot of claim 9, wherein the controller, when controlling the movement of the main body, is further configured to:
  when the tilt angle of the main body is greater than the threshold angle, direct the main body to move forward through particular area.

11. The mobile robot of claim 1, wherein the sensor comprises at least one inclination sensor to measure a tilt direction and a tilt angle of a portion of the main body.

12. The mobile robot of claim 11, wherein the inclination sensor comprises at least one of a tilt sensor or an acceleration sensor.

13. The mobile robot of claim 1, wherein the controller is further configured to:
  when the inclination angle of the slope is equal to or less than the predetermined angle, perform the tilt compensation according to the inclination angle; and
  when the inclination angle of the slope is greater than the predetermined angle, control the main body to bypass the slope.

14. The mobile robot of claim 1, wherein the first optical pattern includes a horizontal portion, and the controller, when compensating for the tilt is further configured to:
  perform tilt compensation relative to the horizontal portion based on the tilt of the main body.

15. The mobile robot of claim 1, wherein the controller is further configured to determine that the obstacle is a cliff and to direct the main body to travel in a path to avoid the cliff.

16. The mobile robot of claim 1, wherein the controller is further configured to change a direction travelled by the main body when a tilt angle of the main body is greater than a threshold angle.

17. The mobile robot of claim 1, wherein the controller is further configured to determine that the main body is passing over the obstacle when a tilt angle of the main body changes from a first value to a second value over a threshold distance.

18. The mobile robot of claim 17, wherein the controller is further configured to:
  direct the main body to continue over the obstacle when the tilt angle of the main body is equal to or less than a threshold value, and
  direct the main body to reverse when the tilt angle of the main body is above the threshold value.

19. The mobile robot of claim 1, wherein the controller is further configured to determine that the obstacle includes a slope and to direct the main body to travel in a path through the slope when an inclination of the slope is less than a threshold angle.

20. The mobile robot of claim 1, wherein the controller, when performing the tilt compensation, is further configured to:
  adjust a position of the first optical pattern based on the inclination angle of the slope.

* * * * *